United States Patent [19]

Richards

[11] Patent Number: 5,327,235
[45] Date of Patent: Jul. 5, 1994

[54] VIDEO CONVERSIONS OF VIDEO SIGNAL FORMATS

[75] Inventor: John W. Richards, Stockbridge, United Kingdom

[73] Assignee: Sony United Kingdom Limited, Staines, United Kingdom

[21] Appl. No.: 9,670

[22] Filed: Jan. 27, 1993

[30] Foreign Application Priority Data

Feb. 17, 1992 [GB] United Kingdom ............... 9203331

[51] Int. Cl.$^5$ .............................................. H04N 7/01
[52] U.S. Cl. ..................................... 348/441; 348/180
[58] Field of Search ................. 358/140, 11, 160, 22, 358/180, 138, 141, 12; H04N 7/07

[56] References Cited

U.S. PATENT DOCUMENTS

| | | | |
|---|---|---|---|
| 3,457,369 | 2/1966 | Davies et al. | 358/140 |
| 3,803,352 | 4/1974 | Goldberger | 358/140 |
| 4,862,266 | 8/1989 | Gillard | 358/140 |
| 5,221,966 | 6/1993 | Clayton et al. | 358/140 |

Primary Examiner—James J. Groody
Assistant Examiner—Glenton B. Burgess
Attorney, Agent, or Firm—William S. Frommer; Alvin Sinderbrand

[57] ABSTRACT

A digital video signal is real-time converted from a high definition format (such as 1250 lines, 50 field/s, 2:1 interlace, with a 16:9 aspect ratio) to a conventional definition format (such as 525 lines, 60 field/s, 2:1 interlace, with a 4:3 aspect ratio) by compressing the image so that the active area extends across only part of an intermediate field/frame; by writing the pixels of the high definition fields to alternate field stores at the high definition format pixel rate; and by forming the output frames in the conventional definition format by reading, at the conventional definition pixel rate, pixels of at least part of the active portion from the field store which is not being written. Alternatively, a conventional definition format signal is converted to a high definition format by placing each conventional definition field in a portion of a high definition field and then expanding that portion substantially to fill the high definition field. In order to deal with a change in field rate between the input and output video, a standards converter is included in the high definition part of the arrangement.

20 Claims, 9 Drawing Sheets

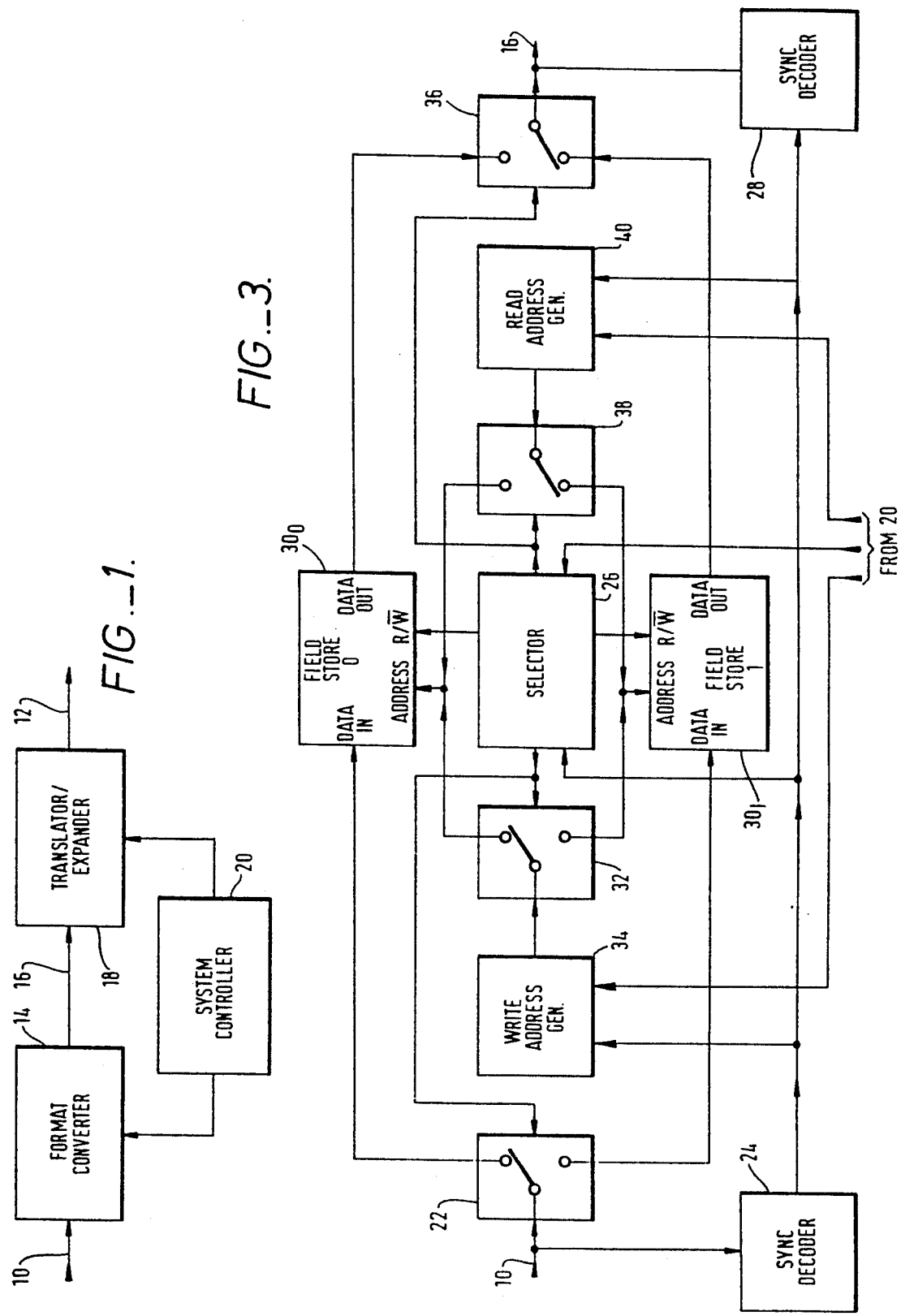

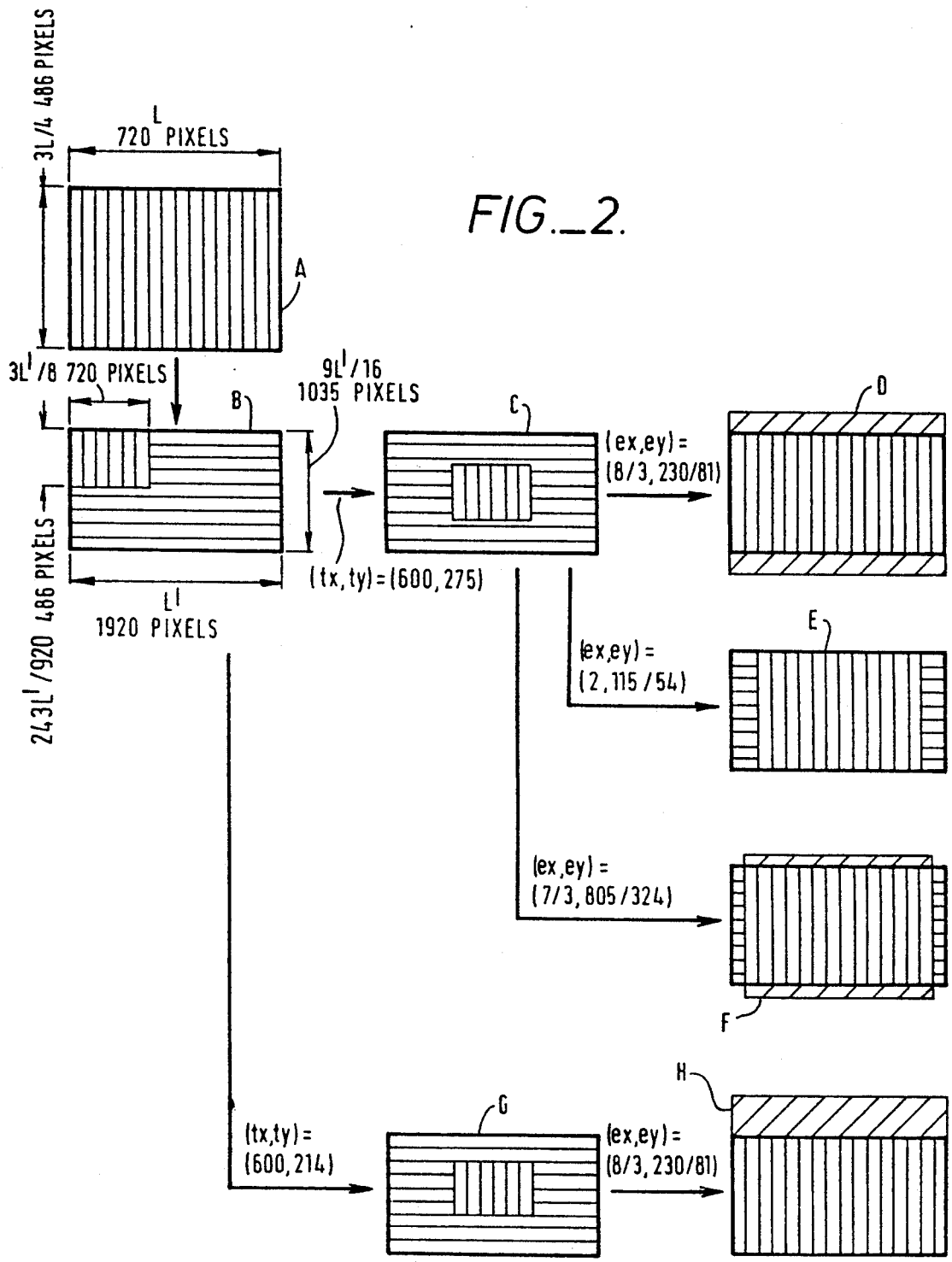
FIG._2.

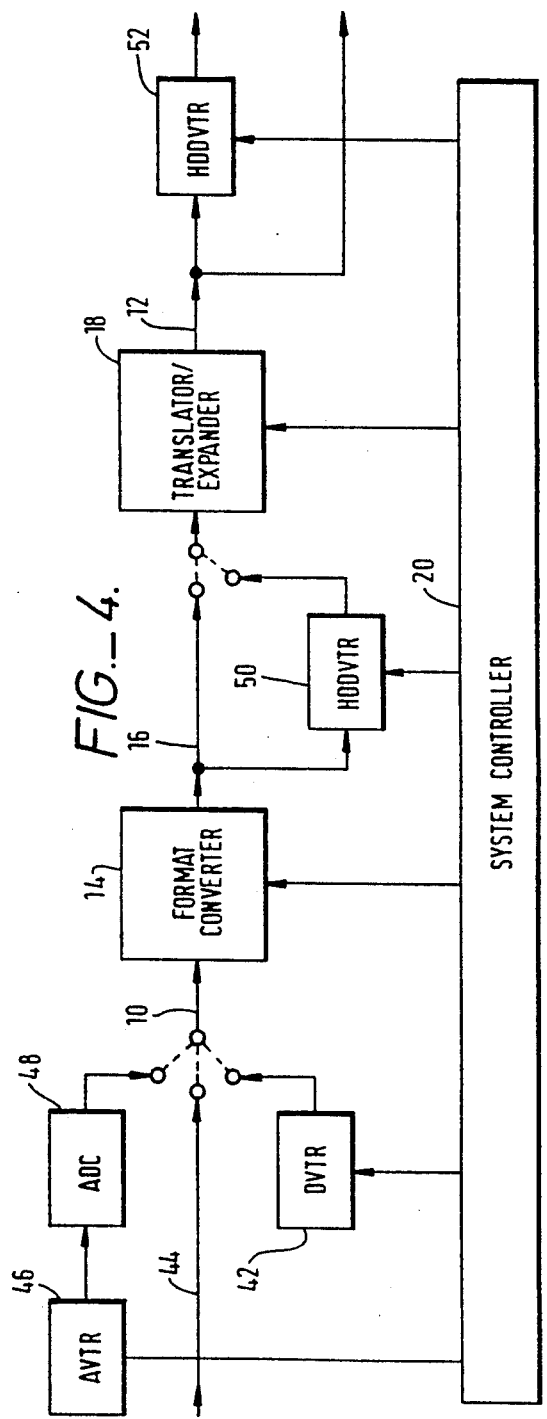
FIG._4.
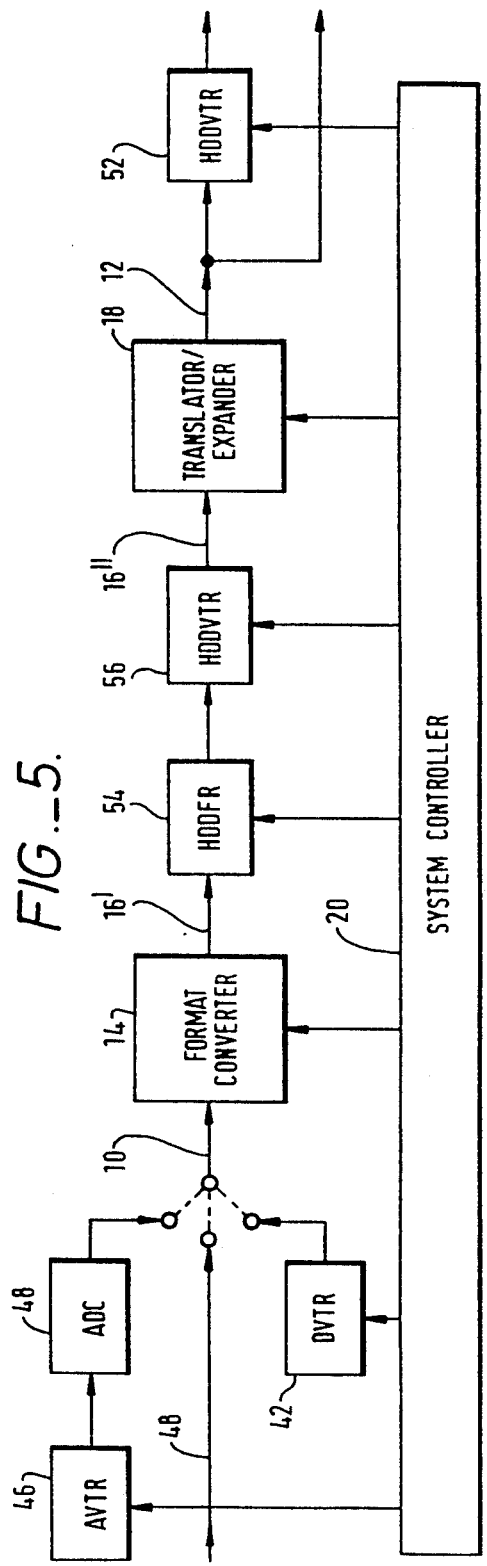
FIG._5.

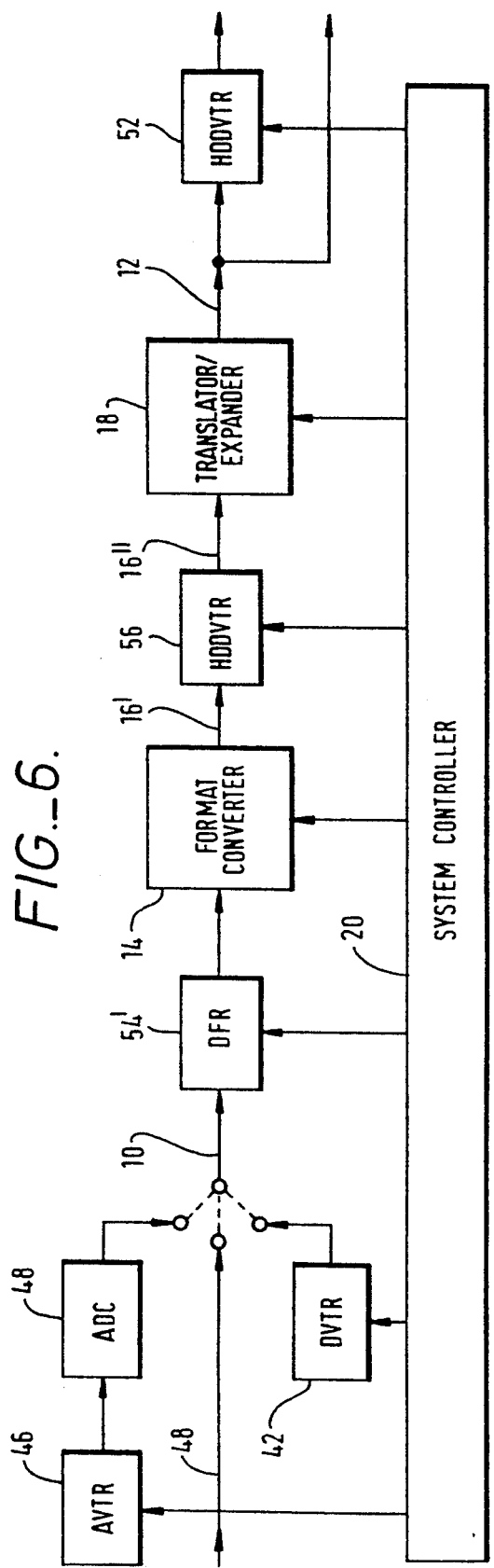
FIG._6.

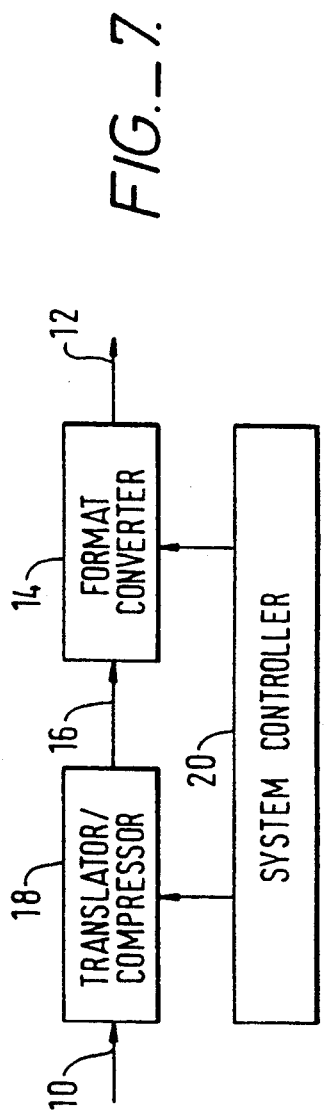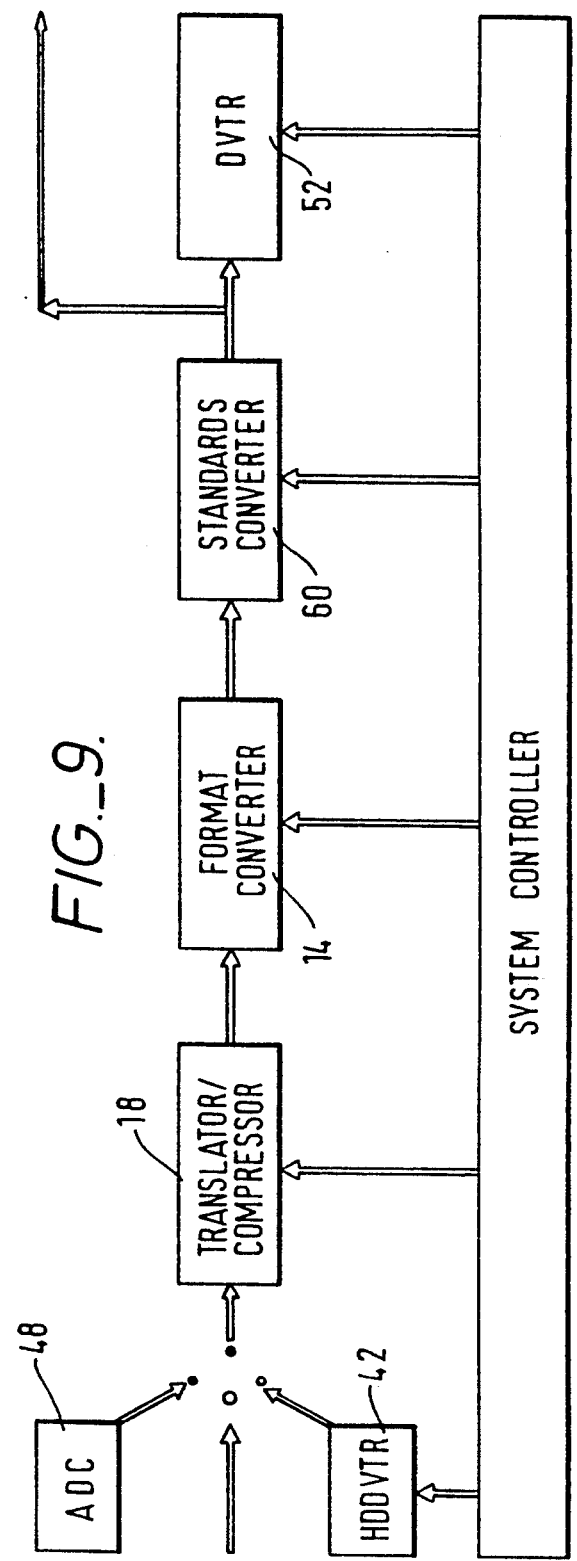
FIG._7.
FIG._9.

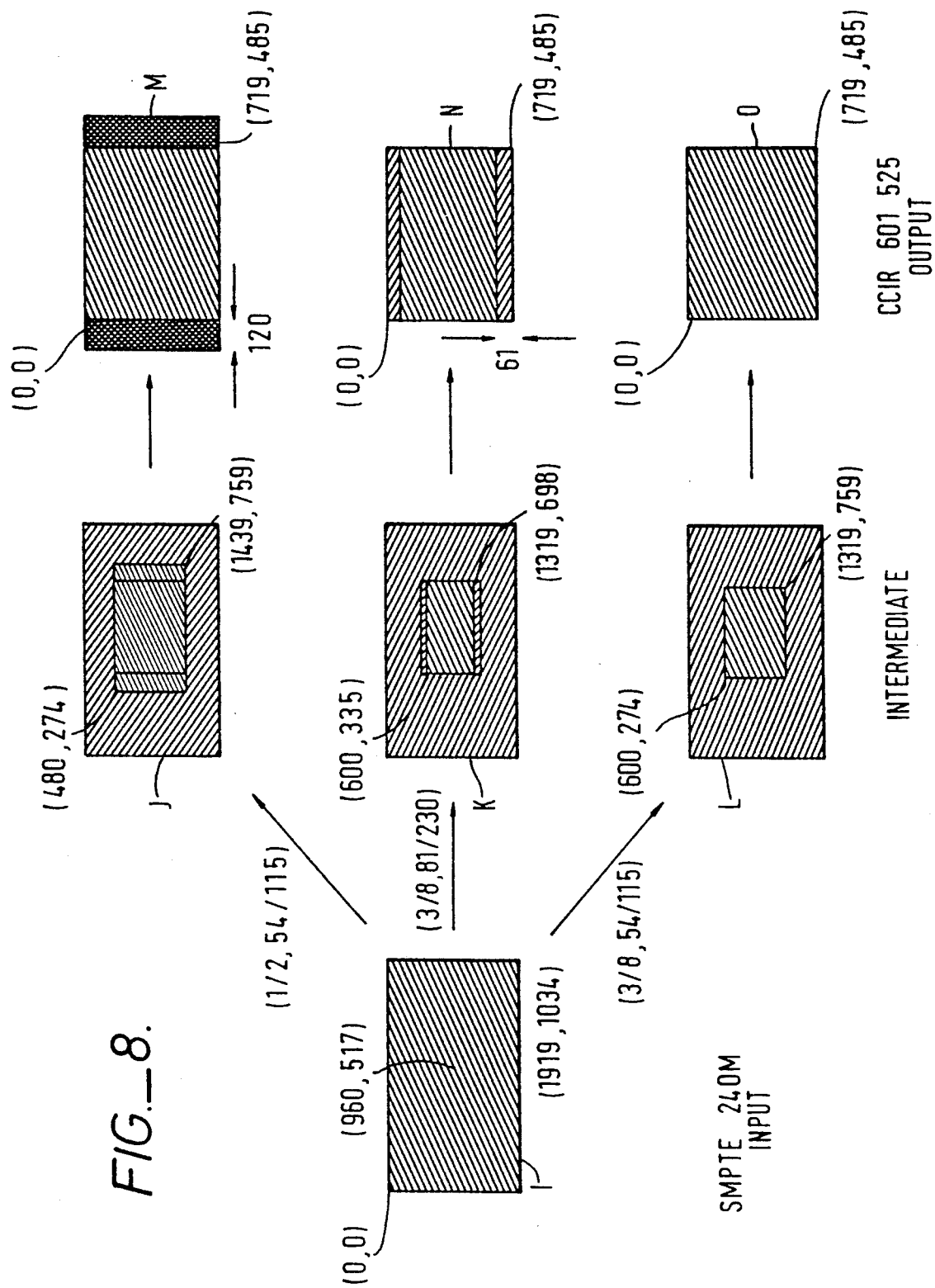
FIG._8.

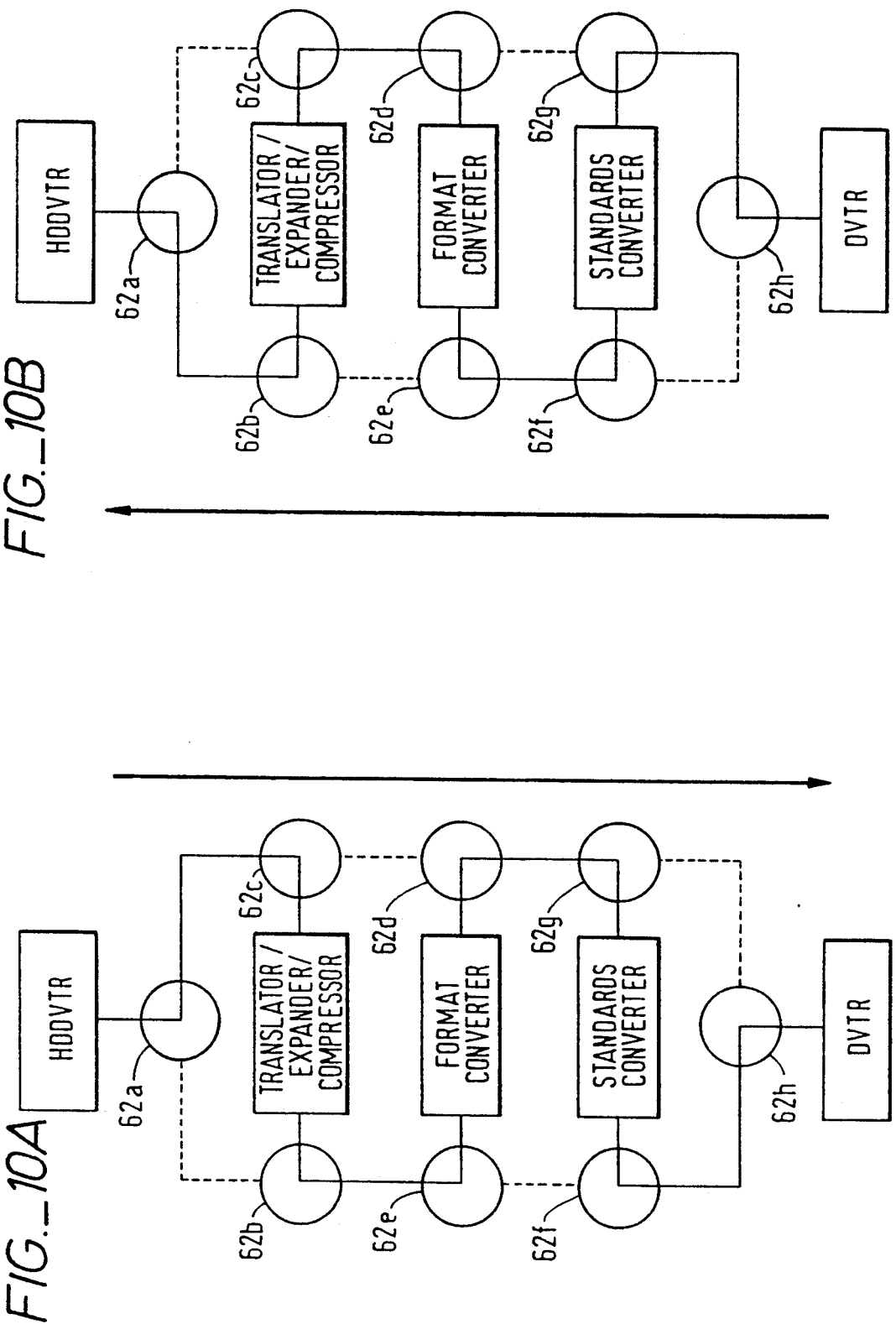
FIG._10B
FIG._10A

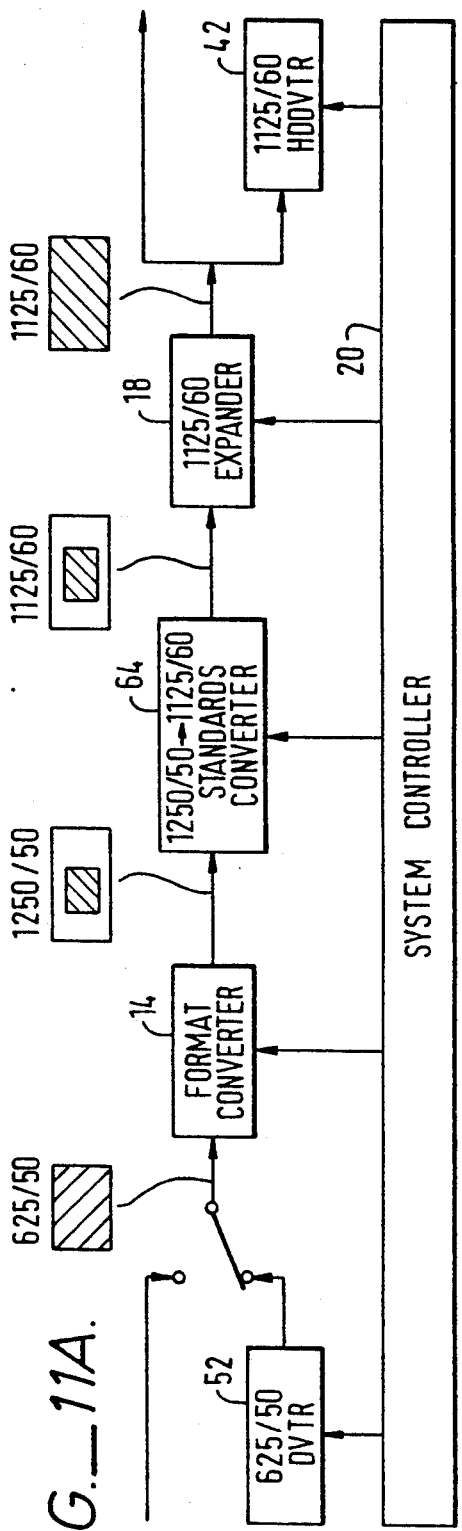
FIG._11A.
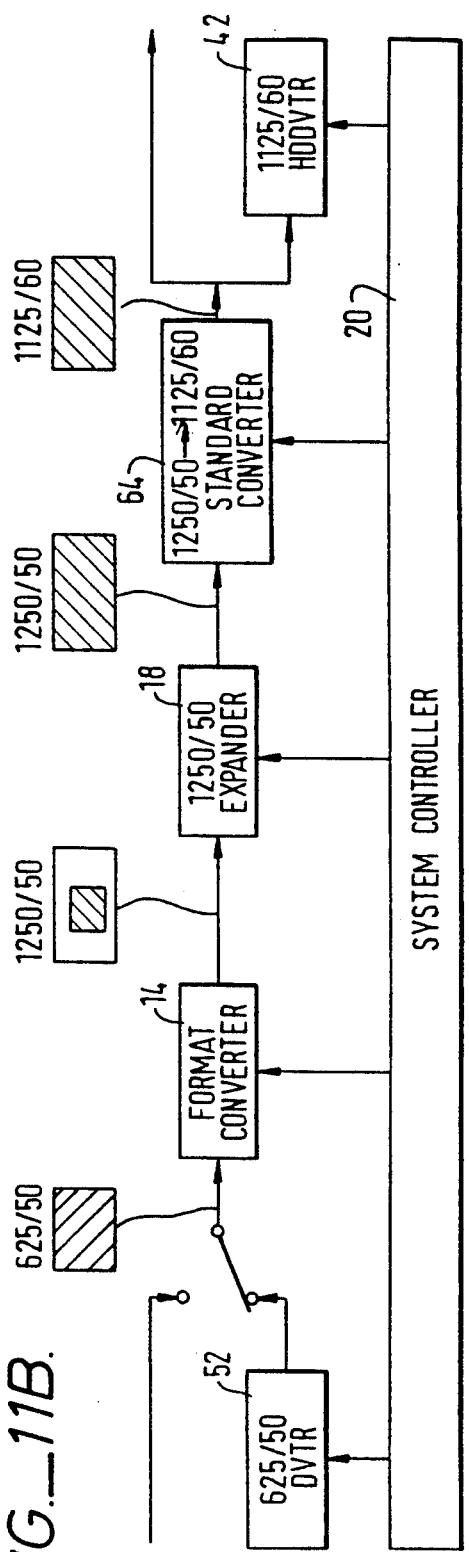
FIG._11B.

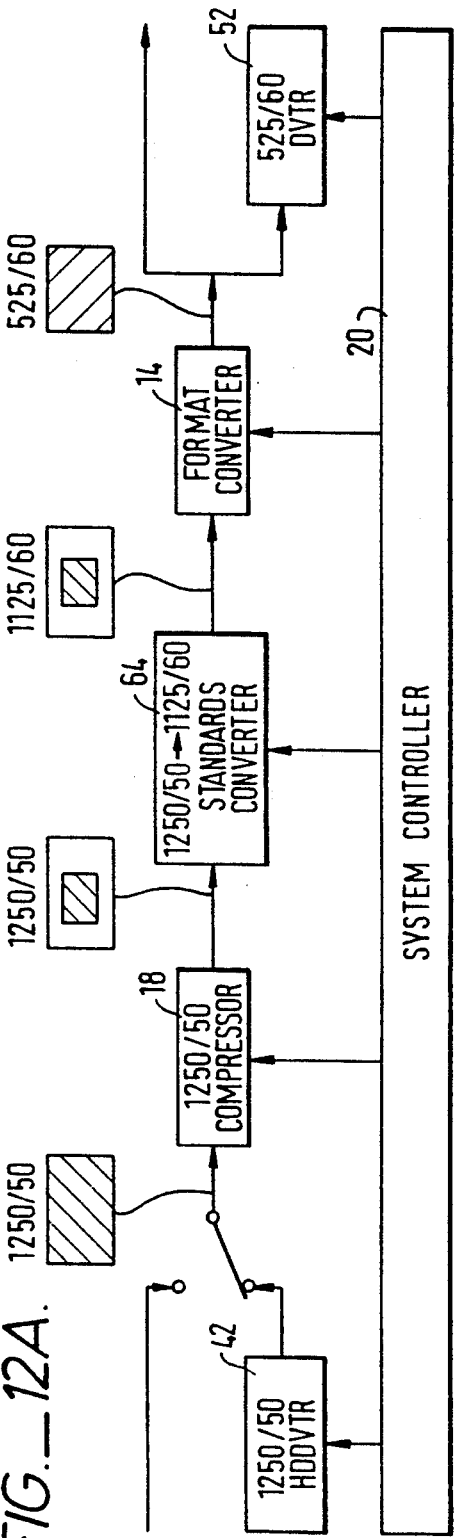
FIG._12A.
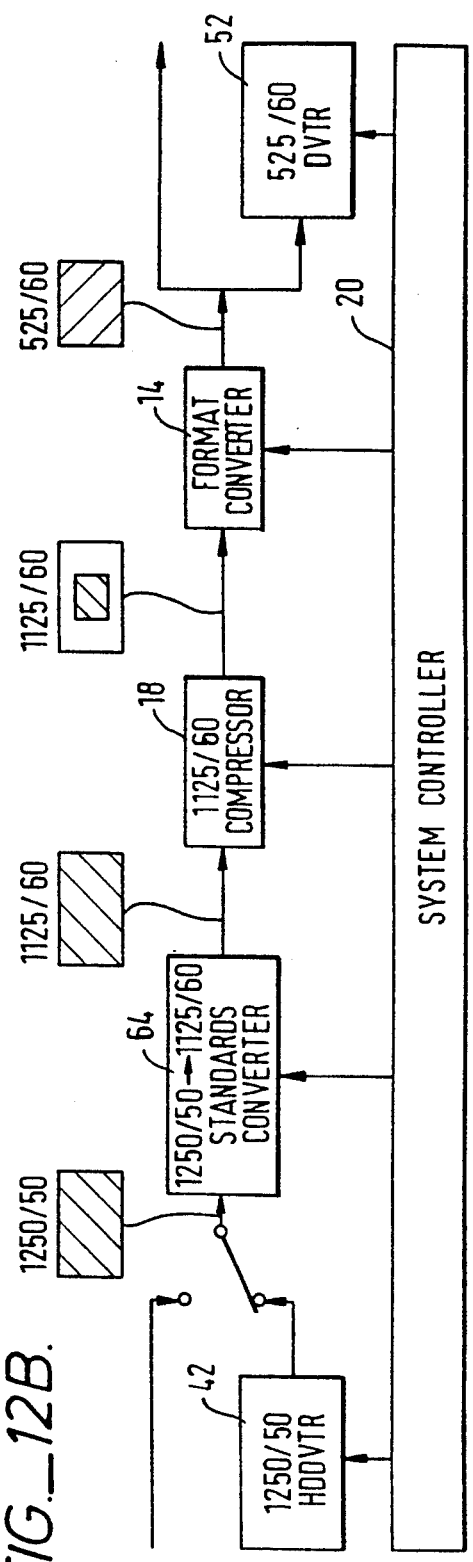
FIG._12B.

VIDEO CONVERSIONS OF VIDEO SIGNAL FORMATS

BACKGROUND OF THE INVENTION

1. Field of the Invention

This invention relates to conversion of digital video signals from a conventional format to a high-definition format and/or vice versa.

2. Description of the Prior Art

High definition digital video is becoming increasingly popular, and common formats for the video signals are:

SMPTE 240M format, which is characterised by 1125 lines, 60 field/s, 2:1 interlace, with a 16:9 aspect ratio and 1920×1035 active pixels per frame; and European HDTV format, which is characterised by 1250 lines, 50 field/s, 2:1 interlace, with a 16:9 aspect ratio and 1920×1152 active pixels per frame.

More and more material is being originated in these formats for processing and/or distribution in them. However, there is obviously a great bulk of material which has been originated, or still needs to be originated, in conventional definition format, and there is a desirability to be able to up-convert such material to high definition format so that it can be integrated with other high definition material and/or so that it can be distributed in high definition format. Furthermore, material which is now being originated in high definition format may need to be converted to conventional definition format so that it can be integrated with other conventional definition material and/or so that it can be distributed in conventional definition format. Examples of conventional definition digital formats are:

CCIR 601 525-line format, which is characterised by 525 lines, 60 field/s, 2:1 interlace, with a 4:3 aspect ratio and 720×486 active pixels per frame;

CCIR 601 625-line format, which is characterised by 625 lines, 50 field/s, 2:1 interlace, with a 4:3 aspect ratio and 720×576 active pixels per frame;

4fsc 525 D2 format, which is characterised by 525 lines, 60 field/s, 2:1 interlace, with a 4:3 aspect ratio and 768×486 active pixels per frame; and 4fsc 625 D2 format, which is characterised by 625 lines, 50 field/s, 2:1 interlace, with a 4:3 aspect ratio and 948×576 active pixels per frame.

(Although 60 field/s is mentioned above as the field rate for the 525-line formats, strictly the field rate should be 59.94 field/s. Nevertheless, for simplicity in this specification the value of 60 field/s is used.)

Problems associated with such conversion include dealing with the change of aspect ratio between 4:3 for the conventional definition formats and 16:9 for the high definition formats, in addition to dealing with the changes of resolution, which are different in the horizontal and vertical directions.

U.S. Pat. No. 5,208,669 (corresponding to GB 9100314.5 filed Jan. 8, 1991) hereinafter referred to as "the first earlier application" describes an apparatus for up-converting a digital video signal from a first definition format to a second higher-definition format, comprising: storage means which can store an input field/frame of pixel data in the first format; storage control means for controlling the storage means to output the stored pixel data together with dummy data as an intermediate field/frame in the second format, such that the pixel data occupies a continuous active portion of the intermediate field/frame and the dummy data occupies the remainder of the intermediate field/frame; and means for processing the intermediate field/frame by expanding the active portion thereof in the vertical and horizonal directions and producing an output field/frame in the second format such that the pixel data extends across substantially the whole of the output field/frame in at least one of the two directions.

The apparatus of the first earlier application is of particular application in converting digital video signals between formats having different aspect ratios, and in this case the processing means may be arranged to be operable in a side-bar mode to expand the active portion of the intermediate field/frame to an extent such that the active portion extends across substantially the whole of the output field/frame in one of the directions and such that the dummy data occupies at least one marginal portion of the output field/frame. Alternatively or additionally, the processing means may be arranged to be operable in an edge-crop mode to expand the active portion of the intermediate field/frame to an extent such that the active portion extends across substantially the whole of the output field/frame in one of the directions and across more than the output field/frame in the other direction so that at least one marginal portion of the active portion is cropped. Alternatively or additionally, the processing means may be arranged to be operable in a zoom mode to expand the active portion of the intermediate field/frame to an extent such that the active portion extends across more than the whole of the output field/frame in one of the directions and across less than or more than the output field/frame in the other direction. Preferably, the processing means is operable in the side-bar, edge-crop or zoom mode, as the case may be, to expand the intermediate field/frame with different horizontal and vertical expansions such that the ratio of the horizontal to vertical expansion is equal to the ratio of the pixel aspect ratio of the first format to that of the second format. Alternatively or additionally, the processing means may be arranged to be operable in a titles mode to expand the active portion of the intermediate field/frame to an extent such that the active portion extends across substantially the whole of the output field/frame in both of the directions without any substantial cropping of the active portion. The processing means may include means to select operation in any one of the modes.

In one embodiment described in the first earlier application, in which the storage means can store a field/frame of pixel data in the second format, and the storage control means includes means to select writing to and reading from the storage means and means for generating addresses for the storage means; the address generating means is operable, (a) when writing is selected, to generate addresses sequentially for the active portion of storage means corresponding to a field/frame in the first format, and (b) when reading is selected, to generate addresses sequentially corresponding to a field/frame in the second format; and the storage means stores the dummy data at addresses not in the active portion thereof.

In an alternative embodiment described in the first earlier application, in which the storage control means includes means to select writing to and reading from the storage means, and means for generating addresses for the storage means, the address generating means is operable (a) when writing is selected, to generate addresses sequentially for the field/frame of pixel data, and (b) when reading is selected, to generate intermittently lines of addresses corresponding to lines of addresses of the field/frame in the first format. The storage control means is operable to output partial lines of the dummy pixel data between the generation of one line of addresses and the next, and to output lines of the dummy pixel data between the generation of one field/frame of addresses and the next. This embodiment has the advantage that the size of the storage means is related to the number of pixels in a field/frame in the first format, rather than the larger number of pixels in a field/frame in the second format.

In either of these embodiments described in the first earlier application, a further such storage means may be provided, with the storage control means controlling the two storage means such that while one is being written to, the other is being read from, and vice versa. This has the advantage that, at least for some types of conversion, the apparatus can operate continuously.

Also, with any of these embodiments, the apparatus may be arranged so that when writing of the, or one of the, storage means is selected, the addresses for that storage means are generated at the pixel rate of the first format; and when reading of the, or one of the, storage means is selected, the addresses for that storage means are generated at the pixel rate of the second format. This enables real-time operation of the apparatus.

The first earlier application also presents a method of up-converting a digital video signal from a first definition format to a second higher-definition format. The method comprises the steps of storing an input field/frame of pixel data in the first format; reading the stored pixel data interspersed with dummy data as an intermediate field/frame in the second format, such that the previously stored pixel data occupies a contentious active portion of the intermediate field/frame and the dummy data occupies the remainder of the intermediate field/frame; and expanding the active portion of the intermediate field/frame in the vertical and horizonal directions and producing an output field/frame in the second format such that the previously stored pixel data extends across substantially the whole of the output field/frame in at least one of the two directions.

U.S. patent application Ser. No. 07/907,315 filed on Jul. 1, 1992 (corresponding to GB 9114706.6 filed on Jul. 8, 1991) hereinafter referred to as "the second earlier application" describes an apparatus for down-converting a digital video signal from a first definition format to a second lower-definition format, comprising: means for processing an input field/frame by compressing the active portion thereof in the vertical and horizonal directions to produce an intermediate field/frame in the first format in which the active portion occupies only part of the field/frame; storage means which receives the intermediate field/frame of pixel data in the first format; storage control means for controlling the storage means to store at least part of the active portion of the intermediate field/frame and to output the stored pixel data as a field/frame in the second format, such that the pixel data of the active portion extends across substantially the whole of the output field/frame in at least one of the two directions. The apparatus is of particular application in converting digital video signals between formats having different aspect ratios, and in this ease the processing means may be arranged to be operable in a letter-box mode to compress the active portion of the input field/frame to ail extent such that the active portion extends across substantially the whole of the output field/frame in one of the directions and such that dummy data occupies at least one marginal portion of the output field/frame. Alternatively or additionally, the processing means may be arranged to be operable in an edge-crop mode to compress the active portion of the input field/frame to an extent such that the active portion extends across substantially the whole of the output field/frame in one of the directions and across more than the output field/frame in the other direction so that at least one marginal portion of the active portion is cropped. Alternatively or additionally, the processing means may be arranged to be operable in a zoom mode to compress the active portion of the input field/frame to an extent such that the active portion extends across more than the whole of the output field/frame in one of the directions and across less than or more than the output field/frame in the other direction. Preferably, the processing means is operable in the letter-box, edge-crop or zoom mode, as the case may be, to compress the input field/frame with different horizontal and vertical compressions such that the ratio of the horizontal to vertical compression is equal to the ratio of the pixel aspect ratio of the first format to that of the second format, so that the picture geometry is preserved. Alternatively or additionally, the processing means may be arranged to be operable in a titles mode to compress the active portion of the input field/frame to an extent such that the active portion extends across substantially the whole of the output field/frame in both of the directions without any substantial cropping of the active portion. In this case, the picture geometry is not preserved, but that is often acceptable when, for example, the picture is formed of titles. The processing means may include means to select operation in any one of the modes.

In one embodiment described in the second earlier application, in which the storage control means includes means to select writing to and reading from the storage means, and means for generating addresses for the storage means, the address generating means is operable: (a) when writing is selected, to generate intermittently lines of addresses corresponding to part-lines of addresses in the first format; and (b) when reading is selected, to generate addresses sequentially for the field/frame of pixel data; and the storage control means is operable to discard partial lines of the pixel data of the intermediate fields/frames between the generation of one line of write addresses and the next, and to discard lines of the pixel data of the intermediate fields/frames between the generation of one field/frame of write addresses and the next. Thus, the storage means merely needs to be of a capacity such that it can store one field/frame in the second, lower definition format.

In another embodiment described in the second earlier application, in which the storage means can store a field/frame of pixel data in the first format, the address generating means is operable: (a) when writing is selected, to generate addresses sequentially for the storage means corresponding to a field/frame in the first format; and (b) when reading is selected, to generate addresses corresponding to a field/frame in the second format containing at least said part of the active portion of the intermediate field/frame.

In this case, a further such storage means may be provided, with the storage control means controlling the two storage means such that while one is being written to, the other is being read from, and vice versa. This has the advantage that, at least for some types of conversion, the apparatus can operate continuously.

The apparatus may be arranged so that when writing of the, or one of the, storage means is selected, the addresses for that storage means are generated at the pixel rate of the first format; and when reading of the, or one of the, storage means is selected, the addresses for that storage means are generated at the pixel rate of the second format. This enables real-time operation of the apparatus.

In addition to the apparatus of the second earlier application operating in a down-conversion mode, the apparatus is preferably also operable in an up-conversion mode, as described in the first earlier application, in which: the storage means stores an input field/frame of pixel data in the lower-definition format; the storage control means controls the storage means to output the stored pixel data together with dummy data as an intermediate field/frame in the higher-definition format, such that the pixel data occupies a continuous active portion of the intermediate field/frame and the dummy data occupies the remainder of the intermediate field/frame; and the processing means processes the intermediate field/frame by expanding the active portion thereof in the vertical and horizonal directions and producing an output field/frame in the higher-definition format such that the pixel data extends across substantially the whole of the output field/frame in at least one of the two directions.

The second earlier application also describes a method of down-converting a digital video signal from a first definition format to a second lower-definition format, comprising the steps of: compressing the active portion of an input field/frame in the vertical and horizonal directions to produce an intermediate field/frame in the first format in which the active portion occupies only a part of the field/frame; storing at least part of the active portion of the intermediate input field/frame of pixel data in the first format; reading the stored pixel data as an output field/frame in the second format, such that the pixel data of the active portion extends across substantially the whole of the output field/frame in at least one of the two directions.

In addition to dealing with changes in aspect ratio and resolution, the first and second earlier applications contemplate dealing with a change in field or frame rate as between the input and output video by causing the source material (such as scrolling titles, a panned background, or computer generated scenes) to move faster or slower than the rate of movement required in the converted video. The second earlier application also describes an arrangement which uses a conventional definition standards converter (for example a CCIR 601 525-lines, 60 field/s to 625-lines, 50 field/s converter) in the conventional definition portion of the apparatus in order to achieve a required change in field rate.

OBJECT AND SUMMARY OF THE INVENTION

The present invention is concerned with dealing with a change in field or frame rate between the input and output video, and the present invention advantageously uses a standards converter working on the high definition video.

More specifically, in accordance with one aspect of the present invention, there is provided an apparatus for up-converting a digital video signal from a first format having a first field or frame rate to a second higher-definition format having a second different field or frame rate, comprising: storage means which can store input fields or frames of pixel data in the first format at the first field or frame rate; storage control means for controlling the storage means to output the stored pixel data together with dummy data at the first field or frame rate as intermediate fields or frames in a third format having higher definition than the first format, such that the pixel data occupies a continuous active portion of each intermediate field or frame and the dummy data occupies the remainder of the intermediate field or frame; and means for processing the intermediate fields or frames by expanding the active portions thereof in the vertical and horizonal directions and changing the field or frame rate thereof to the second field or frame rate to produce output fields or frames in the second format such that the pixel data extends across substantially the whole of the output fields or frames in at least one of the two directions.

In one embodiment, the processing means comprises: standards conversion means for converting the intermediate fields or frames from the third format to the second format and from the first field or frame rate to the second field or frame rate; and expansion means for expanding the active portions of the converted fields or frames in the vertical and horizonal directions. In another embodiment, the processing means comprises: expansion means for expanding the active portions of the intermediate fields or frames in the vertical and horizonal directions; and standards conversion means for converting the expanded fields or frames from the third format to the second format and from the first field or frame rate to the second field or frame rate.

In accordance with a second aspect of the present invention, there is provided an apparatus for down-converting a digital video signal from a first format having a first field or frame rate to a second lower-definition format having a second different field or frame rate, comprising: means for processing the input fields or frames by compressing the active portions thereof in the vertical and horizonal directions and changing the field or frame rate thereof to the second field or frame rate to produce intermediate fields or frames in a third format having a higher definition than the second format in which the active portions occupy only part of the fields or frames; storage means which receives the intermediate fields or frames of pixel data in the third format at the second field or frame rate; storage control means for controlling the storage means to store at least part of the active portion of each intermediate field or frame and to output the stored pixel data in the second format at the second field or frame rate, such that the pixel data of the active portions extends across substantially the whole of the output fields or frames in at least one of the two directions.

In a further embodiment of the invention, the processing means comprises: compression means for compressing the active portions of the input fields or frames in the vertical and horizonal directions; and standards conversion means for converting the compressed fields or frames from the first format to the third format and from the first field or frame rate to the second field or frame rate. Alternatively, in another embodiment of the invention, the processing means comprises: standards conversion means for converting the input fields or frames from the, first format to the third format and from the first field or frame rate to the second field or frame rate; and compression means for compressing the active portions of the converted fields or frames in the vertical and horizonal directions.

The apparatus according to the first and second aspects of the present invention may also include the preferred features described above of the apparatuses of the first and second earlier applications both of which are incorporated herein by reference as if printed in full. Also, the standards conversion means mentioned above may be provided by an apparatus, as described in detail and claimed in U.S. patent application Ser. No. 07/933,932 filed on Aug. 24, 1992 (corresponding to GB 9118340.0 as filed on Aug. 27, 1991) hereinafter referred to as the third application and incorporated herein by reference as if printed in full.

Other aspects of the present invention cover the methods performed by the apparatuses described above.

Other objects, features and advantages of the present invention will become apparent upon consideration of the following detailed description of a preferred embodiment thereof, especially when considered with the accompanying drawings in which like reference numerals are employed to designate the same or similar components in the different figures.

BRIEF DESCRIPTION OF THE DRAWINGS

FIGS. 1 to 10 are copies of drawings included in the second earlier application, in particular:

FIG. 1 is a basic block diagram of an up-converter apparatus;

FIG. 2 illustrates various frames arising in the apparatus;

FIG. 3 is a block diagram of a format converter forming part of the apparatus of FIG. 1;

FIG. 4 is a block diagram of a system for up-converting a 525-lines 60 field/s video signal to an 1125-lines 60 field/s digital format;

FIG. 5 is a block diagram of a system for up-converting a 625-lines 50 field/s video signal to an 1125-lines 60 field/s digital format;

FIG. 6 shows a modification to the system of FIG. 5;

FIG. 7 is a basic block diagram of a down-converter apparatus;

FIG. 8 illustrates various frames arising in the apparatus;

FIG. 9 is a block diagram of a down-conversion system including temporal conversion; and FIGS. 10A and 10B are basic block diagrams of a down- and up-converter; and FIGS. 11 to 12 are new to this specification, and in particular:

FIGS. 11A and 11B are basic block diagrams of two further versions of an up-converter; and FIGS. 12A and 12B are basic block diagrams of two further versions of a down-converter.

DETAILED DESCRIPTION OF THE PREFERRED EMBODIMENT

Referring to FIG. 1, an apparatus is shown for up-converting an input conventional definition CCIR 601 525-line format digital video signal on input line 10 to an output high definition SMPTE 240M format digital video signal on output line 12. The input signal format is characterised by 525 lines, 60 field/s, 2:1 interlaced, and each frame has an active area of 720 (H) pixels×486 (V) pixels with a 4(H):3(V) frame aspect ratio, as shown by the vertically hatched frame A in FIG. 2. It will be appreciated, therefore, that the input frame size is L×3L/4 (where L is the width of the input frame). Also, each input pixel has an aspect ratio of 4/720(H):3/486(V), or 9:10. It will be noted that the input pixels are not square. The output signal format is characterised by 1125 lines, 60 field/s, 2:1 interlaced, and each frame has an active area of 1920(H) pixels×1035(V) pixels with a 16(H):9(V) frame aspect ratio, as shown for example by the vertically hatched portion of frame D in FIG. 2. It will be appreciated that the output frame size is L'×9L'/16 (where L' is the width of the output frame). Also, each output pixel has an aspect ratio of 16/1920(H):9/1035(V), or 23:24. Thus, not only are the output pixels not square, but their aspect ratio is different to that of the input pixels.

Each frame on line 10 is input to a format converter 14, which outputs a corresponding intermediate frame on line 16 to an image translator/expander 18, which in turn outputs the output frame on line 12. The intermediate frame on line 16 is of SMPTE 240M format, but the pixel data of the input frame is contained in only part of the intermediate frame, for example in the top-left corner, as shown by the vertically hatched portion of frame B in FIG. 2, and has a size of 3L'/8(H)×243L'/920(V) containing the 720(H)×486(V) pixels. The remaining data in the intermediate frame B is dummy data, as shown by horizontal hatching.

In the translator/expander 18, the pixel data of the intermediate frame B undergoes a translation of $(t_x, t_y)$, as shown for example by frames C and G in FIG. 2, and then undergoes an expansion about the centre pixel of the frame at location (960, 518) by a factor of $(e_x, e_y)$, as shown for example by frames D, E, F and H in FIG. 2.

In the example shown by frame C, the translation $(t_x, t_y)$ is (600, 275), which has the effect of placing the active pixel data (vertically hatched) in the centre of the frame.

From frame C, frame D is formed by an expansion $(e_x, e_y)$ of (8/3, 230/81). The horizontal expansion of 8/3 has the effect of extending the, width of the active area from 720 pixels to 1920 pixels, so that it is equal to the width of the frame. The vertical expansion of 230/81 has the effect of extending the height of the active area from 486 pixels to 1380 pixels so that the aspect ratio of the image is returned to the originating value L': (1380/1035)×(9L'/16), or 4:3. However, this vertical expansion also has the effect of extending the upper and lower marginal portions of the image outside of the frame D, and therefore these marginal portions, as shown by diagonal hatching above and below frame D, whose heights are each about 172 pixels, are cropped.

As an alternative, from frame C, frame E is formed by an expansion $(e_x, e_y)$ of (2, 115/54). The vertical expansion of 115/54 has the effect of extending the height of the active area from 486 pixels to 1035 pixels, so that it is equal to the height of the frame. The horizontal expansion of 2 has the effect of extending the width of the active area from 720 pixels to 1440 pixels so that the aspect ratio of the image is returned to the originating value of 1440L'/1920:9L'/16, or 4:3. However, the horizonal expansion is not sufficient to cause the active areas to extend completely across the frame E, and therefore left and right marginal portions of the frame, whose widths are each 240 pixels, are provided by the dummy data, as shown by the horizontal hatching in frame E.

It will be noted that some of the image has been lost from frame D, which may be acceptable in some cases, but not in others, and that undesirable side-bars are produced in frame E. In some cases, an expansion between those for frames D and E may be acceptable, giving less lost image than frame D and narrower side-bars than frame E. From frame C, frame F shows an expansion ($e_x$, $e_y$) of (7/3, 805/324). The horizontal expansion of 7/3 has the effect of extending the width of the active area from 720 pixels to 1680 pixels, leaving side-bars of dummy data each 120 pixels wide. The vertical expansion of 805/324 has the effect of extending the height of the active area from 486 pixels to 1207 pixels so that the aspect ratio of the image is returned to the originating value of 1680L'/1920:(1207/1035)×(9L'/16), or 4:3, and so that top and bottom marginal portions of approximate heights of 86 pixels each are cropped.

It is to be noted that for each of frames D, E and F, the ratio of the horizontal expansion to the vertical expansion $e_x/e_y$ is always the same and is 108/115. This is necessary in order not to distort the geometry of the image. The value $e_x/e_y$ of 108/115 is derived from the ratio of the pixel aspect ratio of 9:10 for the CCIR 601 525-line format to the pixel aspect ratio of 23:24 for the SMPTE 240M format, i.e. (9/10)/(23/24)=108/115.

There are cases in which distortion of the picture may be acceptable, for example when titles spread across substantially the whole of the input frame on a relatively less significant background, and it is desired not to lose any of the title information and also to avoid the production of any side-bars in the output frame. In these cases, a 'title' mode of operation is employed in which the horizontal and vertical expansions are such as to cause the active area to extend horizontally from 720 to 1920 pixels and vertically from 486 to 1035 pixels. Thus, an expansion ($e_x$, $e_y$) of (8/3, 115/54) is required, where the horizontal expansion $e_x$ is the same as for the edge-crop mode (frame D in FIG. 2) and the vertical expansion $e_y$ is the same as for the side-bars mode (frame E in FIG. 2).

In the examples described so far, the translation ($t_x$, $t_y$)=(600, 275) between frames B and C places the active area in the centre of frame C, so that there is symmetrical cropping top and bottom in frames D and F, and so that there are symmetrical side-bars left and right in frames E and F. In some cases, it may be desirable for the cropping and/or the side-bars not to be symmetrical. Frames G and H show an example where it is important for all of the bottom of the input image to be included in the output image, but it does not matter if the top is cropped, and it is desired not to have any side-bars. In this case, frame G is formed by a translation of ($t_x$, $t_y$) of (600, 214) (so that the active portion of the frame G is higher in the frame than in the ease of frame C). Frame G then undergoes an expansion ($e_x$, $e_y$) of (8/3, 230/81) (which is similar to the expansion between frames C and D). However, because of the modified position of the active area in frame G, the active area in frame H extends exactly across the whole of the frame and extends to the bottom of the frame without cropping. The top marginal portion of the active area, 345 pixel high, is cropped, as indicated by the diagonal hatching. This is referred to as a pan and scan mode of operation.

In the above examples, the active area of the output frame is either less than the frame width (frames E and F), or is equal to it (frames D and H). If desired, a greater horizontal expansion may be employed (that is $e_x$ may be greater than 8/3), so that the left and/or right marginal portions of the image, in addition to the upper and lower marginal portions, are cropped in the output frame, and the translation ($t_x$, $t_y$) may be chosen so that the desired portion of the input image appears in the output frame. This is referred to as a zoom mode of operation.

The above examples have considered the case of up-conversion from CCIR 601 525-line format to SMPTE 240M format. For the other formats mentioned at the beginning of this specification, different translations ($t_x$, $t_y$) and expansions ($e_x$, $e_y$) will be required. For all the formats considered, the size ($P_x$, $P_y$) of the active portion of the frame, the frame aspect ratio $R_f$, and the pixel aspect ratio $R_p$, are as given in Table 1 below:

TABLE 1

| FORMAT | Active Pixels ($P_x,P_y$) | Frame Aspect Ratio ($R_f$) | Pixel Aspect Ratio ($R_p$) |
|---|---|---|---|
| SMPTE 240M | (1920, 1035) | 16/9 | 23/24 |
| European HDTV | (1920, 1152) | 16/9 | 16/15 |
| CCIR 601 525-line | (720, 486) | 4/3 | 9/10 |
| CCIR 601 625-line | (720, 576) | 4/3 | 16/15 |
| 4fsc D2 525-line | (768, 486) | 4/3 | 27/32 |
| 4fsc D2 625-line | (948, 576) | 4/3 | 64/79 |

It should be noted that the pixel aspect ratio is given by $R_p = R_f \cdot P_y/P_x$.

The translation ($t_x$, $t_y$) required to bring the active area of the intermediate frame to the centre of the frame is given by ($t_x$, $t_y$)=(($P_x''-P_x'$)/2, ($P_y''-P_y'$)/2), where ($P_x'$, $P_y'$) and ($P_x''$, $P_y''$) are the sizes, in pixels, of the input and output frames, respectively. Thus, for the possible conversions considered here, the necessary translations are as given by Table 2 below:

TABLE 2

| TRANSLATION TO CENTRE | OUTPUT FORMAT | |
|---|---|---|
| ($t_x$, $t_y$) INPUT FORMAT | SMPTE 240M | European HDTV |
| CCIR 601 525-line | (600, 274) | (600, 333) |
| CCIR 601 625-line | (600, 299) | (600, 288) |
| 4fsc D2 525-line | (576, 274) | (576, 333) |
| 4fsc D2 625-line | (486, 299) | 486, 288) |

The translations given above apply if the output frame is not to be offset with respect to the input frame. The values given are modified if pan and scan is to be employed.

The expansion ($e_x'$, $e_y'$) required to produce an output frame just with no side-bars is given by ($e_x'$, $e_y'$)=(($P_x''/P_x'$), ($P_x''R_p''$)/($P_x'R_p'$)), where $R_p'$ and $R_p''$ are the pixel aspect ratios for the input and output formats, respectively. Thus, for the possible conversions considered here, the necessary expansions are as given by Table 3 below:

TABLE 3

| EXPANSION ($e_x'$, $e_y'$) NO SIDE-BARS | OUTPUT FORMAT | |
|---|---|---|
| INPUT FORMAT | SMPTE 240M | European HDTV |
| CCIR 601 525-line | (8/3, 230/81) | (8/3, 256/81) |
| CCIR 601 625-line | (8/3, 115/48) | (8/3, 8/3) |
| 4fsc D2 525-line | (5/2, 230/81) | (5/2, 256/81) |
| 4fsc D2 625-line | (160/79, 115/48) | (160/79, 8/3) |

On the other hand, the expansion ($e_x''$, $e_y''$) required to produce an output frame just with no cropping is given by ($e_x''$, $e_y''$)= (($P_y''R_p'$)/($P_y'R_p''$), ($P_y''/P_y'$)). Thus, for the conversions considered here, the necessary expansions are as given by Table 4 below:

TABLE 4

| EXPANSION ($e_x''$, $e_y''$) NO CROPPING | OUTPUT FORMAT | |
|---|---|---|
| INPUT FORMAT | SMPTE 240M | European HDTV |
| CCIR 601 525-line | (2, 115/54) | (2, 64/27) |
| CCIR 601 625-line | (2, 115/64) | (2, 2) |
| 4fsc D2 525-line | (15/8, 115/54) | (15/8, 64/27) |
| 4fsc D2 625-line | (120,79, 115/64) | (120/79, 2) |

Also, the expansion ($e_x'$, $e_y''$) required to produce an output frame in the titles mode is given by ($e_x'$, $e_y''$) = (($P_x''/P_x'$), ($P_y''/P_y'$)). Thus, for the possible conversions considered here, the necessary expansions are as given by Table 5 below:

TABLE 5

| EXPANSION ($e_x'$, $e_y''$) TITLES MODE | OUTPUT FORMAT | |
|---|---|---|
| INPUT FORMAT | SMPTE 240M | European HDTV |
| CCIR 601 525-line | (8/3, 115/54) | (8/3, 64/27) |
| CCIR 601 625-line | (8/3, 115/64) | (8/3, 2) |
| 4fsc D2 525-line | 5/2, 115/54) | 5/2, 64/27) |
| 4fsc D2 625-line | (160/79, 115/64) | (160/79, 2) |

In the arrangement described above, the active area of the intermediate frame B is placed in the corner of the frame by the format converter 14, and the translator/expander 18 then moves the active area to, or near, the centre of the frame (frames C and G) and then expands the active area from a centre of expansion at the centre of the frame.

In one alternative arrangement, the active area of the frame B may be directly placed by the format converter 14 in the centre of the frame. Thus, a frame like frame C in FIG. 2 is directly produced, and no translation, as opposed to expansion, is required to produce the frames D, E and F with symmetrical cropping, side-bars, or other effects. In order to produce an asymmetrical frame like frame G, a small amount of translation would need to be provided by the translator/expander 18.

In another alternative arrangement, the active portion of the intermediate frame is placed in a corner of the frame, as shown by frame B in FIG. 2, but the translator/expander 18 does not separately translate and expand the active portion. Instead, the translator/expander 18 expands the active area from a centre of expansion which does not coincide with the centre of the frame. For example, if frame B as shown in FIG. 2 were expanded with ($e_x$, $e_y$) = (8/3, 230/81) from a centre of expansion at the top-left corner of the frame, the result would be as shown by frame H, except that the cropped marginal portion would be at the bottom, rather than the top, of the frame.

As shown in FIG. 1, the format converter 14 and translator/expander 18 are controlled by a system controller 20 which provides signals to the converter 14 and translator/expander 18 controlling: the input and output formats; the translation and expansion provided by the translator/expander 18; and the value of the dummy data. As an alternative, these parameters may be manually set directly, preset, or hard-wired.

Referring now to FIG. 3, further detail of the format converter 14 is shown. The input signal on line 10 is fed to a controllable data input switch 22 and to a synchronisation decoder 24 which detects the horizontal and vertical synchronisation signals in the input signal and supplies timing signals to a selector circuit 26, to write and read address generators 34, 40, and to a synchronisation formatter 28 which adds synchronisation signals to the output signal on line 16. The selector 26 controls the data input switch 22 to route the incoming pixel data either to the data input of one field store $30_0$ or to the data input of another field store $30_1$. The selector 26 also controls a controllable write address switch 32 to route write addresses from the write address generator 34 to the address input of the same field store $30_0$ or $30_1$. The converter 14 also includes a controllable data output switch 36 under control of the selector circuit 26, which is controlled to route data read from the field store $30_0$ or $30_1$, which is not being written to, to the line 16. The selector circuit 26 also controls a controllable read address switch 38 to route read addresses from the read address generator 40 to the address input of the field store $30_0$ or $30_1$, which is being read. The selector circuit also supplies read/write enable control signals to the field stores $30_0$, $30_1$. The address generators 34,40 and the selector circuit 26 also receive control signals from the system controller indicative of the type of input signal format and of the required type of output signal format.

FIG. 3 is a schematic drawing to assist in illustrating the pixel data flow and the address data flow. In practice, the data input switch 22 may be omitted and the input line 10 may be directly connected to the field stores $30_0$, $30_1$, because each field store will ignore input data on line 10 when reading is selected. Also, the field stores may have tri-state outputs, in which case the data output switch 36 is redundant. Furthermore, the address switches 32, 38 may be omitted if the field stores have separate inputs for write addresses and read addresses.

The operation of the format converter of FIG. 3 will now be described for conversion from 4fsc D2 525-line format to SMPTE 240M format. As each input frame arrives on line 10, the odd field of the frame is written to the field store $30_0$, and the even field is then written to the field store $30_1$. While the odd field is being written to the field store $30_0$, the even field of the preceding frame is being read from the field store $30_1$ and output on line 16, and while the even field of each frame is being written to the field store $30_1$, the odd field of the same frame is being read from the field store $30_0$ and output on line 16.

The input pixels arrive at a rate of 14.3 MHz (which is four times the NTSC sub-carrier frequency) and accordingly, for writing, the write address generator 34 produces sequential write addresses ($p_x$, $p_y$) at that rate. The write addresses of data for an even field of a frame increment in the fashion shown in Table 6 below:

TABLE 6

| (0, 0) | (1, 0) | (2, 0) | (3, 0) | ... | (718, 0) | (719, 0) |
|---|---|---|---|---|---|---|
| (0, 2) | (1, 2) | (2, 2) | (3, 2) | ... | (718, 2) | (719, 2) |
| (0, 4) | (1, 4) | (2, 4) | (3, 4) | ... | (718, 4) | (719, 4) |
| . | . | . | . | ... | . | . |
| . | . | . | . | | . | . |
| (0, 484) | (1, 484) | (2, 484) | (3, 484) | ... | (718, 484) | (719, 484) |

Somewhat similarly, the write addresses of data for an odd field of a frame increment in the fashion shown in Table 7 below:

TABLE 7

| (0, 1) | (1, 1) | (2, 1) | (3, 1) | ... | (718, 1) | (719, 1) |
|---|---|---|---|---|---|---|
| (0, 3) | (1, 3) | (2, 3) | (3, 3) | ... | (718, 3) | (719, 3) |
| (0, 5) | (1, 5) | (2, 5) | (3, 5) | ... | (718, 5) | (719, 5) |
| . | . | . | . | ... | | |

TABLE 7-continued

| . | . | . | . | . | . |
|---|---|---|---|---|---|
| . | . | . | . | . | . |
| (0, 485) | (1, 485) | (2, 485) | (3, 485) | ... (718, 485) | (719, 485) |

The output pixels need to be produced at a pixel rate of 74.25 MHz, and dummy pixel data need to be produced for the latter part of each line and for the latter part of each field. The dummy data may be produced either by pre-storing a dummy data element at one particular location in each field store $30_0$, $30_1$, for example at (0, 486) and by pointing to that location whenever dummy data is to be output. Alternatively, field stores $30_0$, $30_1$, may be employed which each have a capacity of one field in the high definition format (i.e. 1920 pixels × 1035 pixels for SMPTE 240M format) and dummy data may be pre-stored in that part of each field store $30_0$, $30_1$ to which the input data is not written.

In the first case, the read addresses provided by the read address generator 40 would be incremented in the fashion shown in Table 8 below for the even field of each frame:

TABLE 8

| (0, 0) | (1, 0) | ... | (718, 0) | (719, 0) | (0, 486) × 1200 |
|---|---|---|---|---|---|
| (0, 2) | (1, 2) | ... | (718, 2) | (719, 2) | (0, 486) × 1200 |
| (0, 4) | (1, 4) | ... | (718, 4) | (719, 4) | (0, 486) × 1200 |
| . | . | ... | . | . | . |
| . | . | ... | . | . | . |
| (0, 484) | (1, 484) | ... | (718, 484) | (719, 484) | (0, 486) × 1200 |
| | | | | (0, 486) × 528000 | |

Somewhat similarly, the read addresses provided by the read address generator 40 would be incremented in the fashion shown in Table 9 below for the odd field of each frame:

TABLE 9

| (0, 1) | (1, 1) | ... | (718, 1) | (719, 1) | (0, 486) × 1200 |
|---|---|---|---|---|---|
| (0, 3) | (1, 3) | ... | (718, 3) | (719, 3) | (0, 486) × 1200 |
| (0, 5) | (1, 5) | ... | (718, 5) | (719, 5) | (0, 486) × 1200 |
| . | . | ... | . | . | . |

TABLE 9-continued

| . | . | . | . | . |
|---|---|---|---|---|
| (0, 485) | (1, 485) | ... (718, 485) | (719, 485) | (0, 486) × 1200 |
| | | | (0, 486) × 526080 | |

In the second case, the read addresses provided by the read address generator 40 would be incremented in the fashion shown in Table 10 below for the even field of each frame:

TABLE 10

| (0, 0) | (1, 0) | ... | (719, 0) | (720, 0) | ... | (1919, 0) |
|---|---|---|---|---|---|---|
| (0, 2) | (1, 2) | ... | (719, 2) | (720, 2) | ... | (1919, 2) |
| (0, 4) | (1, 4) | ... | (719, 4) | (720, 4) | ... | (1919, 4) |
| . | . | ... | . | . | ... | . |
| (0, 484) | (1, 484) | ... | (719, 484) | (720, 484) | ... | (1919, 484) |
| (0, 486) | (1,486) | ... | ... | ... | ... | (1919, 486) |
| . | . | ... | ... | ... | ... | . |
| (0, 1034) | (1, 1034) | ... | ... | ... | ... | (1919, 1034) |

Somewhat similarly, the read addresses provided by the read address generator 40 would be incremented in the fashion shown in Table 11 below for the odd field of each frame:

TABLE 11

| (0, 1) | (1, 1) | ... | (719, 1) | (720, 1) | ... | (1919, 1) |
|---|---|---|---|---|---|---|
| (0, 3) | (1, 3) | ... | (719, 3) | (720, 3) | ... | (1919, 3) |
| (0, 5) | (1, 5) | ... | (719, 5) | (720, 5) | ... | (1919, 5) |
| . | . | ... | . | . | ... | . |
| (0, 485) | (1, 485) | ... | (719, 485) | (720, 485) | ... | (1919, 485) |
| (0, 487) | (1,487) | ... | ... | ... | ... | (1919, 487) |
| . | . | ... | ... | ... | ... | . |
| (0, 1033) | (1, 1033) | ... | ... | ... | ... | (1919, 1033) |

In the above tables, the addresses to the right of, and/or below, the dashed lines contain the dummy data.

Also, in the above tables, the addresses relate to pixel positions in the pictures, but the RAMs of the field stores need not necessarily be organised in this manner, and a conversion may be made between the pixel address and the RAM address. For example, when the scheme of Tables 8 and 9 is used, the RAM address A for the even and odd field stores may be obtained as:

$$A = p_x + (1024 p_y/2) \text{—even}$$

$$A = p_x + (1024(p_y-1)/2) \text{—odd}.$$

In the case where $p_y$ is represented as a 9-bit number $p_{y8}$ to $p_{y0}$, and $p_x$ is represented as a 10-bit number $p_{x9}$ to $p_{x0}$, this conversion can be simply accomplished by supplying the most significant eight bits $p_{y8}$ to $p_{y1}$ of $p_y$ as the most significant eight bits $A_{17}$ to $A_{10}$ of the RAM address A and supplying the ten bits $p_{x9}$ to $p_{x0}$ of $p_x$ as the least significant ten bits $A_9$ to $A_0$ of the RAM address A. Thus, in this case the RAM of each field store $30_0$, $30_1$ needs to have a capacity of $2^{18}$, or 256 kpixels. If the apparatus is to be able to convert from CCIR 601 625-line format, or 4fsc 625 D2 format, for each of which there are 288 pixels vertically in a field, then $p_y$ may be represented by a 10-bit number $p_{y9}$ to $p_{y0}$, of which nine bits $p_{y9}$ to $p_{y1}$ are used, and in this case each field store $30_0$, $30_1$ will need to have a capacity of $2^{19}$, or 0.5 Mpixels.

In the case of the scheme of Tables 10 and 11, the RAM address A for the even and odd field stores may be obtained as:

$$A = p_x + (2048 p_y/2) \text{—even}$$

$$A = p_x + (2048(p_y-1)/2) \text{—odd}.$$

In the case where $p_y$ and $p_x$ are each represented as 11-bit numbers $p_{y10}$ to $p_{y0}$ and $p_{x10}$ to $p_{x0}$, this conversion can be simply accomplished by supplying the most significant ten bits $p_{y10}$ to $p_{y1}$ of $p_y$ as the most significant ten bits $A_{20}$ to $A_{11}$ of the RAM address A and supplying the eleven bits $p_{x10}$ to $p_{x0}$ of $p_x$ as the least significant eleven bits $A_{10}$ to $A_0$ of the RAM address A. Thus, in this case the RAM of each field store $30_0$, $30_1$ needs to have a capacity of $2^{21}$, or 2 Mpixels.

It should be noted that other forms of conversion may be made between the pixel addresses and RAM addresses, or the address generators 34, 40 may be designed to generate addresses which can be directly used by the field stores $30_0$, $30_1$.

It will be appreciated that the dummy data appears, in some cases, in the frames output from the translator/expander 18, for example in the frames E and F shown in FIG. 2. Therefore, the dummy data is preferably chosen to provide a background colour, such as black, or even a background pattern in the second case given above. To this end, in an initialisation procedure of the format converter 14, the data input switch 22 may be moved to third and fourth positions (not shown) to route background pixel data from the system controller 20 to the first and second field stores $30_0$, $30_1$, with the write address generator 34 being controlled to generate the address (0, 486) in the first case mentioned above, or to generate all of the required background data addresses $720 <= p_x <= 1919$ and/or $486 <= p_y <= 1034$ in the second case mentioned above. If this is done, then the active area of the frame B (FIG. 2) is preferably placed by the format converter 14 in the centre of the frame.

FIG. 4 shows a system configuration, employing the apparatus described above, for conversion from 525 lines 60 field/s conventional definition format to 1125 lines 60 field/s high definition format. The conventional definition digital signal is supplied via line 10 to the format converter 14 selectively from a conventional definition digital video tape recorder (DVTR) 42, from other digital sources on line 44, or from an analogue video tape recorder (AVTR) 46 via an analogue-to-digital converter 48. The intermediate high definition frames output from the format converter 14 on line 16 may selectively be supplied directly to the translator/expander 18, or via a high definition DVTR (HDDVTR) 50. The frames output from the translator/expander 18 on line 12 may be supplied to an HDDVTR 52 or elsewhere. In addition to controlling the format converter 14 and the translator/expander 1.8, the system controller 20 also controls the input DVTR 42, the input AVTR 46, the intermediate HDDVTR 50 and the output HDDVTR 52 to set tape start and stop positions, etc.

In the conversion from CCIR 601 525-lines format or 4fsc D2 525-lines format to SMPTE 240M format, or from CCIR 601 625-lines format or 4fsc D2 625-lines format to European HDTV format, there is no substantial change in field or frame rate, and therefore temporal conversion does not need to be considered. (Although the proper field rate of an NTSC signal is 0.1% slower than 60 Hz, that is 59.94 Hz, the converter is run off-line, and therefore the input and output can be both locked at 60 Hz or 59.94 Hz without any adverse effects.) In some cases of conversion from an input format of 50 field/s 2:1 interlaced to an output format of 60 field/s 2:1 interlaced, or vice versa the need for temporal conversion may be ignored, for example if the source material is a static image, such as a still background, or static title. However, in other cases, temporal conversion does need to be taken into account. Nevertheless, in the case of source material such as scrolling titles, a panned background, or computer generated scenes, the movement in the source material can be generated at a rate 5/6 slower, or 6/5 faster than the movement required in the output material and thus provide temporal conversion a priori.

FIG. 5 shows a system configuration, employing the apparatus described above, for conversion from 625 lines 50 field/s conventional definition format to 1125 lines 60 field/s high definition format. As in the case of FIG. 4, the conventional definition digital signal is supplied via line 10 to the format converter 14 selectively from a conventional definition digital video tape recorder (DVTR) 42, from other digital sources on line 44, or from an analogue video tape recorder (AVTR) 46 via an analogue-to-digital converter 48. The intermediate high definition frame is output from the format converter 14 on line 16' via a high definition digital frame recorder (HDDFR) 54 to an HDDVTR 56. In a first phase of operation, the part of the system of FIG. 5 described so far is operated in a burst intermittent mode, that is to say a burst of input frames pass from the selected source via the format converter to the HDDFR 54 at the source 50 field/s rate, and then the intermediate frames stored in the HDDFR 54 are output at 60 field/s to the HDDVTR 56 which records at normal speed. This procedure is repeated until all of the source material has been converted. Then, in a second stage of operation, the intermediate frames recorded by the HDDVTR 56 are played back at normal speed and supplied on line 16" to the translator/expander 18 and then to the output HDDVTR 52 or elsewhere.

In one modification to the system of FIG. 5, the HDDFR 54 may be replaced by a pair of HDDFRs and a multiplexer operated under control of the system controller 20 such that while one burst of frames is being output to the HDDVTR 56 by one of the HDDFRs, the next burst of frames can be recorded by the other HDDFR and vice versa. This enables the DVTR 42 to play continuously and the converter 14 to convert continuously in the case of conversion from a 50 field/s conventional definition format to a 60 field/s high definition format. Alternatively, it enables the HDDVTR 56 to record continuously in the id case of conversion from a 60 field/s conventional definition format to a 50 field/s high definition format. These effects may also be obtained by using an HDDFR 54 which can play and record different fields simultaneously.

In another modification of the system of FIG. 5, as shown in FIG. 6, a conventional definition digital frame recorder (CDDFR) 54' may be placed upstream of the format converter 14, instead of HDDFR 54 downstream of the format converter 14. In this case, a burst of input frames are input from the selected source to the CDDFR 54' at the source 50 field/s rate, and then the frames stored in the CDDFR 54' are output at 60 field/s via the format converter 14 to the HDDVTR 56 which records at normal speed. As with the FIG. 5 arrangement, this procedure is repeated until all of the source material has been converted. In other respects, the system of FIG. 6 is similar to that of FIG. 5. Accordingly, in one modification to the system of FIG. 6, the CDDFR 54' may be replaced by a pair of CDDFRs and a multiplexer operated under control of the system controller 20 such that while one burst of frames is being output to the format converter 14 by one of the CDDFRs, the next burst of frames can be recorded by the other CDDFR and vice versa.

As an alternative to using the HDDFR 54 (FIG. 5), or the CDDFR 54' (FIG. 6), an HDDVTR 56 may be employed which is operable in a stunt inode such that it records at 50 field/s and plays back at 60 field/s.

The HDDFR 54 (FIG. 5) may be provided by a Sony HDDF-500. The translator/expander 18 may be implemented by a known digital video effects unit (also known as a digital multi effects unit), which, in known manner, can manipulate a field of digital video data to provide effects such as expansion, contraction, panning, clipping and partial overwriting. In this connection reference is directed, for example to K. Blair Benson, "Television Engineering Handbook", McGraw-Hill Book Company, New York, 1986, Chapter 14, the content of which is incorporated herein. The system controller may be implemented using an edit controller such as the Sony BVE 9000.

It will be appreciated than many modifications and developments may be made to the apparatus, system and method described above.

For example, the description above has considered video signal formats which are 2:1 interlaced, but the invention is equally applicable to progressive scan originated material. In order to maintain resolution and data rate, the stores $30_0$, $30_1$ need in this case to be able to store a whole frame of video signal, rather than one field. Alternatively, the same capacity stores as mentioned above may be used, with a reduced data rate and consequent reduced resolution.

The above description relates to an apparatus and method for up-converting an input conventional definition digital video signal to an output high definition digital video signal. There now follows a description of an apparatus and method for down-converting an input high definition digital video signal to an output conventional definition digital video signal.

Referring to FIG. 7, the apparatus is generally similar to the apparatus of FIG. 1, except that the signal passes through a translator/compressor 18 before passing through a format converter 14. The translator/compressor 18 is somewhat similar to the translator/expander 18 of FIG. 1, with the exception that it operates in a mode to compress the active portion of each frame of the input video signal. The format converter 14 may be identical in construction to the format converter 14 of FIGS. 1 and 3, except that a different addressing scheme is used, and if the format converter 14 of FIG. 7 is to be used solely for down-converting, then smaller field stores $30_0$, $30_1$ may be employed, the minimum size of each being that which can store the active picture data for one conventional definition field.

In FIG. 7, each input frame on line 10 is input to the translator/compressor 18, which outputs a corresponding intermediate frame on line 16 to the format converter 14, which in turn outputs the output frame on line 12. The input frame on line 10 may, for example, be of SMPTE 240M format and is illustrated by frame I in FIG. 8. The intermediate frame on line 16 is of SMPTE 240M format, but the pixel data of the input frame is contained in only part of the intermediate frame, for example in a central portion of the intermediate frame, as shown by the // diagonally hatched portions of frames J, K and L in FIG. 8. Frame J is formed by a compression with a compression factor ($e_x$, $e_y$) of ($\frac{1}{2}$, 54/115) about the centre pixel of the frame at location (960, 517). Accordingly, the pixels of the active area of frame J are at addresses defined by 480≦x≦1439 and 274≦y≦759, as denoted by the // diagonally hatched area in frame J, and the rest of the intermediate frame J is filled with dummy data, as shown by \\ diagonal hatching. The size of the active area of frame J is 960 pixels by 486 pixels.

Alternatively, frame K may be produced by a compression ($e_x$, $e_y$) of ($\frac{3}{8}$, 81/230) about the centre pixel at (960,517) of frame I. Thus, the pixels of the active area of frame K are at locations 600≦x≦1319 and 335≦y≦698, and the size of the active area in frame K is 720 pixels by 364 pixels.

Alternatively, frame L of FIG. 8 is produced by a compression ($e_x$, $e_y$) of ($\frac{3}{8}$, 54/115) about the centre pixel at location (960, 517) of frame I. Thus, the pixels of the active area of frame L are given by 660≦x≦1319 and 274≦y≦759, and the active area has a size of 720 pixels by 486 pixels.

Each of the output frames M, N, O is formed in the same way from the respective intermediate frame J, K, L, and that is by outputting from the intermediate frame J, K, L, the pixels at locations 600≦x≦1319 and 274≦y≦759. It will therefore be appreciated that all of the output frames M, N, O have a size of 720 pixels by 486 pixels. For frame M, the left and right marginal edges of the active area having a width of about 120 pixels are cropped, but the height of the active area is the same as the height of the frame M. Thus, the compression ($e_x$, $e_y$) of ($\frac{1}{2}$, 54/115) between frames I and J produces an output frame M which is edge cropped. On the other hand, in output frame N, the width of the active area (720 pixels) is identical to the width of the output frame N, but the height of the active area (364 pixels) is less than the height of the output frame N, so that a top bar and a bottom bar, each of a height of about 61 pixels, are formed by the dummy data, as shown by \\ diagonal hatching. Therefore, the compression ($e_x$, $e_y$) of ($\frac{3}{8}$, 81/230) between frames I and K produces a letter-box output frame N.

For frame O, the width of the active area (720 pixels) and the height of the active area (486 pixels) are identical to the width and height of the output frame, and therefore there is no edge cropping, and no letter-box effect. Thus, the compression ($e_x$, $e_y$) of ($\frac{3}{8}$, 54/115) between input frame I and intermediate frame L produces a titles mode output frame O.

It should be noted that for the edge cropped and letter-box output frames M, N, the picture is not distorted, because the ratio $e_x/e_y$ of the horizontal compression to the vertical compression is 115/108, which is equal to the ratio of the pixel aspect ratio of 23:24 for the SMPTE 240M format to the pixel aspect ratio of 9:10 for the CCIR 601 525-line format. On the other hand, the titles mode output frame O is vertically stretched, but this will often be acceptable for the display of titles and the like.

In addition to the above three modes of operation, other compressions ($e_x$, $e_y$) may be used in order to provide a zoom inode of operation, but if it is desired not to distort the output picture the ratio $e_x/e_y$ should be maintained as 115/108. Also, the compression between the input frame I and the intermediate frame need not necessarily be centred on the centre pixel (960, 517) of the input frame I, and therefore a pan and scan mode of operation is also possible.

The above examples have considered the case of down-conversion from SMPTE 240M format to CCIR 601 525-line format. For down-conversion between other formats mentioned at the beginning of this specification, different compressions ($e_x$, $e_y$) will be required. For example, the compression ($e_x'$, $e_y'$) required to produce an output frame with edge cropping but just no letter-box effect is given by ($e_x'$, $e_y'$)=(($P_y''.R_p'$)/($P_y'.R_p''$), ($P_y''/P_y'$)), where ($P_x'$, $P_y'$) and ($P_x''$, $P_y''$) are the sizes, in pixels, of the input and output frames, respectively, and $R_p'$ and $R_p''$ are the pixel aspect ratios of the input and output frames, respectively, as given in Table 1 above. Thus, for the possible conversions considered here, the necessary compressions are as given by Table 12 below:

TABLE 12

| COMPRESSION ($e_x'$, $e_y'$) EDGE CROPPING NO LETTER BOX | INPUT FORMAT | |
|---|---|---|
| OUTPUT FORMAT | SMPTE 240M | European HDTV |
| CCIR 601 525-line | (½, 54/115) | (½, 27/64) |
| CCIR 601 625-line | (½, 64/115) | (½, ½) |
| 4fsc D2 525-line | (8/15, 54/115) | (8/15, 27/64) |
| 4fsc D2 625-line | (79/120, 64/115) | (79/120, ½) |

The compression ($e_x''$, $e_y''$) required to produce an output frame with a letter-box effect and just no cropping is given by ($e_x''$, $e_y''$)=(($P_x''/P_x'$), ($P_x''.R_p''$)/($P_x'.R_p'$)). Thus, for the possible conversions considered here, the necessary compressions are as given by Table 13 below:

TABLE 13

| COMPRESSION ($e_x''$, $e_y''$) NO CROPPING LETTER BOX | INPUT FORMAT | |
|---|---|---|
| OUTPUT FORMAT | SMPTE 240M | European HDTV |
| CCIR 601 525-line | (½, 81/230) | (½, 81/256) |
| CCIR 601 625-line | (½, 48/115) | (½, ½) |
| 4fsc D2 525-line | (2/5, 81/230) | (2/5, 81/256) |
| 4fsc D2 625-line | (79/160, 48/115) | (79/160, ½) |

Also, the compression ($e_x''$, $e_y'$) required to produce an output frame in the titles mode is given by ($e_x''$, $e_y'$)=(($P_x''/P_x'$), ($P_y''/P_y'$)). Thus, for the possible conversions considered here the necessary expansions are as given by Table 14 below:

TABLE 14

| COMPRESSION ($e_x''$, $e_y'$) TITLES MODE | INPUT FORMAT | |
|---|---|---|
| OUTPUT FORMAT | SMPTE 240M | European HDTV |
| CCIR 601 525-line | (½, 54/115) | (½, 27/64) |
| CCIR 601 625-line | (½, 64/115) | (½, ½) |
| 4fsc D2 525-line | (2/5, 54/115) | (2/5, 27/64) |
| 4fsc D2 625-line | (79/160, 64/115) | (79/160, ½) |

In down-converting from SMPTE 240M high definition format to CCIR 601 525-lines format, the format converter 14 operates in a somewhat similar way to that described above with reference to FIG. 3, except that the read and write address generating techniques are different. The input pixels arrive at a pixel rate of 74.25 MHz. Many of these pixels are discarded by disabling writing to the field store $30_0$ or $30_1$, so that only those pixels at locations $600 \leq x \leq 1319$ and $274 \leq y \leq 759$ relative to the input high definition frame are stored. In order to achieve this, the write addresses for an even field of an intermediate frame increment in the fashion shown in Table 15 below:

TABLE 15

| D × 1920 × 137 (Lines 0 to 272, step 2, of input frame) | | | | | |
|---|---|---|---|---|---|
| D × 600 (0, 0) | (1, 0) | ... | (718, 0) | (719, 0) | D × 600 |
| D × 600 (0, 2) | (1, 2) | ... | (718, 2) | (719, 2) | D × 600 |
| . | . | ... | . | . | . |
| . | . | | . | . | . |
| D × 600 (0, 482) | (1, 482) | ... | (718, 482) | (719, 482) | D × 600 |
| D × 600 (0, 484) | (1, 484) | ... | (718, 484) | (719, 484) | D × 600 |
| D × 1920 × 138 (Lines 760 to 1034, step 2, of input frame) | | | | | |

In this table, D denotes write disabling of the field store, so that, for example, writing is disabled for the first (1920×137)+600=263640 pixels; then the 720 pixels of line 274, relative to the input frame (or line 0, relative to the frame to be output), are written; then writing is disabled for 600+600=1200 pixels; then the 720 pixels of line 276, relative to the input frame (or line 2, relative to the frame to be output), are written; and so on.

Similarly, the write addresses for an odd field of an intermediate frame increment in the fashion shown in Table 16 below:

TABLE 16

| D × 1920 × 137 (Lines 0 to 273, step 2, of input frame) | | | | | |
|---|---|---|---|---|---|
| D × 600 (0, 1) | (1, 1) | ... | (718, 1) | (719, 1) | D × 600 |
| D × 600 (0, 3) | (1, 3) | ... | (718, 3) | (719, 3) | D × 600 |
| . | . | ... | . | . | . |
| . | . | | . | . | . |
| D × 600 (0, 483) | (1, 483) | ... | (718, 483) | (719, 483) | D × 600 |
| D × 600 (0, 485) | (1, 485) | ... | (718, 485) | (719, 485) | D × 600 |
| D × 1920 × 137 (Lines 761 to 1033, step 2, of input frame) | | | | | |

As described above with reference to FIG. 3, when an input field is being written to one of the field stores $30_0$, $30_1$, the field previously stored in the other field store $30_1$, $30_1$ is read and output. When down converting to CCIR 601 525-lines format, the read addressing technique is identical to the write addressing technique described above with reference to Tables 6 and 7.

With the addressing scheme described above, the capacity of each of the field stores $30_0$, $30_1$ merely needs to be sufficient to store one field in the conventional definition format. If field stores are used which are each capable of storing one field in the high definition format, then a simpler addressing scheme may be used in which all of the pixel data of each intermediate field is written to the relevant field store, and only the appropriate part of the stored field is read out. In this case, the write addresses for the even and odd fields may be incremented as shown in Tables 17 and 18, respectively, below:

TABLE 17

| (0, 0) | (1, 0) | ... | (1918, 0) | (1919, 0) |
|---|---|---|---|---|
| (0, 2) | (1, 2) | ... | (1918, 2) | (1919, 2) |
| . | . | ... | . | . |
| . | . | | . | . |

TABLE 17-continued

| | | | | |
|---|---|---|---|---|
| (0, 1032) | (1, 1032) | ... | (1918, 1032) | (1919, 1032) |
| (0, 1034) | (1, 1034) | ... | (1918, 1034) | (1919, 1034) |

TABLE 18

| | | | | |
|---|---|---|---|---|
| (0, 1) | (1, 1) | ... | (1918, 1) | (1919, 1) |
| (0, 3) | (1, 3) | ... | (1918, 3) | (1919, 3) |
| . | . | ... | . | . |
| . | . | | . | . |
| (0, 1031) | (1, 1031) | ... | (1918, 1031) | (1919, 1031) |
| (0, 1033) | (1, 1033) | ... | (1918, 1033) | (1919, 1033) |

Furthermore, read addresses may be incremented in the fashion shown in Tables 19 and 20 below for the even and odd fields, respectively:

TABLE 19

| | | | | |
|---|---|---|---|---|
| (600, 274) | (602, 274) | ... | (1318, 274) | (1319, 274) |
| (600, 276) | (601, 276) | ... | (1318, 276) | (1319, 276) |
| . | . | ... | . | . |
| . | . | | . | . |
| (600, 756) | (601, 756) | ... | (1318, 756) | (1319, 756) |
| (600, 758) | (601, 758) | ... | (1318, 758) | (1319, 758) |

TABLE 20

| | | | | |
|---|---|---|---|---|
| (600, 275) | (602, 275) | ... | (1318, 275) | (1319, 275) |
| (600, 277) | (601, 277) | ... | (1318, 277) | (1319, 277) |
| . | . | ... | . | . |
| . | . | | . | . |
| (600, 757) | (601, 757) | ... | (1318, 757) | (1319, 757) |
| (600, 759) | (601, 759) | ... | (1318, 759) | (1319, 759) |

It will be appreciated that the up-conversion systems described above with reference to FIGS. 4 to 6 may be modified for down-conversion by:

replacing the format converter 14 of FIGS. 4 to 6 with the translator/compressor 18 of FIGS. 7 and 8;

by replacing the translator/expander 1.8 of FIGS. 4 to 6 with the format converter 14 of FIGS. 7 and 8;

by employing high definition units 42, 46, 48 upstream of the translator/compressor 18, rather than conventional definition units; and by employing conventional definition units 52 downstream of the format converter, rather than high definition units.

Thus, temporal conversion to deal with changes of field/frame rate can be achieved in down conversion. An alternative method of dealing with temporal conversion is illustrated in FIG. 9, and employs a known conventional-definition standards converter 60 between the format converter 14 and the output. For example, an "ADAC" or "ISIS" converter available from AVS Broadcast (an Avesco PLC company) of Chessington, Surrey, United Kingdom, may be employed. The converter 60 can convert between CCIR 601 525-lines and 625-lines formats or between 4fsc 525 D2 and 4fsc 625 D2 formats, including changing the field/frame rate. Thus, for example, to convert from SMPTE 240M high-definition format to CCIR 601 625-lines conventional-definition format, firstly the translator/compressor 18 and format converter 14 convert the input 60 field/s signal to CCIR 601 525-lines format, still with a field rate of 60 Hz, and then the standards converter 60 converts that signal to CCIR 601 625-lines format with a field rate of 50 Hz.

Having described apparatus for up-conversion and apparatus for down conversion, it will be appreciated that a single apparatus may be constructed which is capable selectively of up-conversion and down-conversion, and an example of this is shown in block diagram form in FIGS. 10A and 10B, which show the signal paths, via switches 62a to 62g, through the apparatus for down-conversion and up-conversion, respectively.

The arrangement described above with reference to FIGS. 9 and 10 uses a conventional definition standards converter. There now follows a description of a number of arrangements which use a high definition standards converter for changing the frame/field rate between the input and output video.

Referring to FIG. 11A, an up-converter comprises a format converter 14 which receives input video from a conventional definition (e.g. 625 lines, 50 field/s) digital video tape recorder or another conventional definition source. The format converter 14 operates in the manner described above with reference to FIGS. 1 to 6 to produce a high definition type signal having the same field rate (e.g. 1250 lines, 50 field/s), with the active picture area in the middle of the frame. This signal is input to a high definition standards converter 64 which converts both the number of lines and the field rate (e.g. to 1125 lines, 60 field/s). The output of the converter 64 is supplied to an expander 18 which operates in the manner generally described above with reference to FIGS. 1 to 6 to produce the output video signal in which the active picture area has been expanded substantially to fill the frame. The output video signal may then be recorded on a high definition digital video tape recorder 42.

A modified arrangement as shown in FIG. 11B is similar to the FIG. 11A arrangement except that the standards converter 64 and the expander 18 are transposed, and the expander operates on the 1250 lines, 50 field/s signal.

Arrangements similar to those of FIGS. 11A and 11B may be used for other conversions such as 525 lines, 60 field/s to 1250 lines, 50 field/s.

Referring to FIG. 12A, a down-converter comprises a compressor 18 which receives input video from a high definition (e.g. 1250 lines, 50 field/s) digital video tape recorder or another high definition source. The compressor 18 operates in the manner described above with reference to FIGS. 7 to 9 to produce a high definition type signal having the same field rate (e.g. 1250 lines, 50 field/s), with the active picture area in the middle of the frame. This signal is input to a high definition standards converter 64 which converts both the number of lines and the field rate (e.g. to 1125 lines, 60 field/s). The output of the converter 64 is supplied to a format converter 14 which operates in the manner generally described above with reference to FIGS. 7 to 9 to produce the output video signal which comprises substantially only the active picture area. The output video signal may then be recorded on a conventional definition digital video tape recorder 52.

A modified arrangement as shown in FIG. 12B is similar to the FIG. 12A arrangement except that the standards converter 64 and the compressor 18 are transposed, and the compressor operates on the 1125 lines, 60 field/s signal.

Arrangements similar to those of FIGS. 12A and 12B may be used for other conversions such as 1125 lines, 60 field/s to 625 lines, 50 field/s.

The high definition standards converter 64 described above may employ linear interpolation in a similar way to the ADAC and ISIS conventional definition converters mentioned above. Alternatively, the converter 64 may employ motion compensated temporal interpolation and be provided by the converter described in detail in the third earlier application. In this latter case, the arrangements of FIGS. 11B and 12B are preferred, compared with the arrangements of FIGS. 11A and 12A, so that the converter is processing frames in which the picture substantially fills the frames.

Having described a preferred embodiment of the invention with reference to the accompanying drawings, it is to be understood that the invention is not limited to the precise embodiment and that various changes and modification thereof may be effected by one skilled in the art without departing from the spirit or scope of the invention as defined in the appended claims.

What is claimed is:

1. An apparatus for up-converting a digital video signal from a first format having a first field/frame rate to a second higher-definition format having a second different field/frame rate, comprising:

storage means which can store input fields/frames of pixel data in the first format at said first field/frame rate;

storage control means for controlling said storage means to output the stored pixel data together with dummy data at said first field/frame rate as intermediate fields/frames in a third format having higher definition than said first format, such that the pixel data occupies a continuous active portion of each intermediate field/frame and the dummy data occupies the remainder of that intermediate field or frame; and means for processing said intermediate fields/frames by expanding said active portions thereof in vertical and horizontal directions and changing the field/frame rate thereof to said second field/frame rate to produce output fields/frames in said second format such that the pixel data extends across substantially the whole of said output fields/frames in at least one of the vertical and horizontal directions.

2. An apparatus as claimed in claim 1, wherein said processing means comprises:

standards conversion means for converting said intermediate fields/frames from said third format to said second format and from said first field/frame rate to said second field/frame rate; and expansion means for expanding said active portions of the converted fields/frames in the vertical and horizontal directions.

3. An apparatus as claimed in claim 1, wherein said processing means comprises:

expansion means for expanding said active portions of said intermediate fields/frames in the vertical and horizonal directions; and standards conversion means for converting the expanded fields/frames from said third format to said second format and from said first field/frame rate to the second field/frame rate.

4. An apparatus for down-converting a digital video signal from a first format having a first field/frame rate to a second lower-definition format having a second different field/frame rate, comprising:

means for processing the input fields/frames by compressing active portions thereof in vertical and horizonal directions and changing the field/frame rate thereof to said second field/frame rate to produce intermediate fields/frames in a third format having a higher definition than said second format in which said active portions occupy only part of said fields/frames;

storage means which receives said intermediate fields/frames of pixel data in said third format at said second field/frame rate;

storage control means for controlling said storage means to store at least part of said active portion of each intermediate field/frame and to output the stored pixel data in said second format at said second field/frame rate, such that the pixel data of said active portions extends across substantially the whole of the output fields/frames in at least one of the vertical and horizontal directions.

5. An apparatus as claimed in claim 4, wherein said processing means comprises:

compression means for compressing said active portions of the input fields/frames in the vertical and horizonal directions; and standards conversion means for converting said compressed fields/frames from said first format to said third format and from said first field/frame rate to said second field/frame rate.

6. An apparatus as claimed in claim 4, wherein the processing means comprises:

standards conversion means for converting the input fields/frames from said first format to said third format and from said first field/frame rate to said second field/frame rate; and compression means for compressing said active portions of the converted fields/frames in the vertical and horizonal directions.

7. A method of up-converting a digital video signal from a first format having a first field/frame rate to a second higher-definition format having a second field/frame rate, comprising the steps of:

storing input fields/frames of pixel data in said first format at said first field/frame rate;

reading the stored pixel data interspersed with dummy data at said first field/frame rate as intermediate fields/frames in a third format having a higher definition than said first format, such that the pixel data occupies a continuous active portion of said intermediate field/frame and the dummy data occupies the remainder of said intermediate field/frame; and expanding said active portions of said intermediate fields/frames in vertical and horizontal directions and changing the field/frame rate thereof to said second field/frame rate to produce output fields/frames in said second format such that the pixel data extends across substantially the whole of the output fields/frames in at least one of the vertical and horizontal directions.

8. A method as claimed in claim 7, wherein said expanding step comprises:

converting said intermediate fields/frames from said third format to said second format and from said first field/frame rate to said second field/frame rate; and expanding said active portions of the converted fields/frames in the vertical and horizontal directions.

9. A method as claimed in claim 7, wherein said expanding step comprises:

expanding said active portions of said intermediate fields/frames in the vertical and horizontal directions; and converting the expanded fields/frames from said third format to said second format and from said first field/frame rate to said second field/frame rate.

10. A method of down-converting a digital video signal from a first format having a first field/frame rate to a second lower-definition format having a second different field/frame rate, comprising the steps of:

compressing active portions of the input fields/frames in vertical and horizontal directions and changing the field/frame rate thereof to said second field/frame rate to produce intermediate fields/frames in a third format having a higher definition than said second format in which said active portions occupy only a part of the fields/frames;

storing at least part of said active portion of each intermediate field/frame of pixel data in said third format at said second field/frame rate;

reading the stored pixel data as an output field/frame in said second format at said second field/frame rate, such that the pixel data of said active portions extends across substantially the whole of the output fields/frames in at least one of the vertical and horizontal directions.

11. A method as claimed in claim 10, wherein said compressing step comprises:

compressing said active portions of the input fields/frames in the vertical and horizontal directions; and converting the compressed fields/frames from said first format to said third format and from said first field/frame rate to said second field/frame rate.

12. A method as claimed in claim 10, wherein said compressing step comprises:

converting the input fields/frames from said first format to said third format and from said first field/frame rate to said second field/frame rate; and compressing said active portions of the converted fields/frames in the vertical and horizontal directions.

13. An apparatus as claimed in claim 1, wherein said processing means further comprises tape recording and playback means including a high definition digital video tape recorder (HDDVTR) for converting said first field/frame rate in said intermediate fields/frames to said second field/frame rate in said intermediate fields/frames by recording said intermediate fields/frames at said first field/frame rate and playing back said recorded intermediate fields/frames at said second field/frame rate.

14. An apparatus as claimed in claim 1, further comprising frame recording means including a conventional definition digital frame recorder (CDDFR) for converting said first field/frame rate in said first format to said second field/frame rate in said first format, and wherein said processing means further comprises a high definition digital video tape recorder (HDDVTR), operative to record said intermediate fields/frames at said second field/frame rate and play back the recorded intermediate fields/frames at said second field/frame rate.

15. An apparatus as claimed in claim 1, wherein said processing means further comprises frame recording means having a high definition digital frame recorder (HDDFR) for converting said first field/frame rate in said intermediate fields/frames to said second field/frame rate in said intermediate fields/frames, a high definition digital video tape recorder (HDDVTR) coupled to said HDDFR for recording said intermediate fields/frames at said second field/frame rate played back by said HDDFR, and said HDDVTR plays back said intermediate fields/frames at said second field/frame rate.

16. An apparatus as claimed in claim 15, wherein said frame recording means further comprises a second HDDFR coupled with said first-mentioned HDDFR such that said intermediate fields/frames are alternately supplied to each said HDDFR for conversion to said second field/frame rate, and each said HDDFR alternately supplies said converted intermediate fields/frames for recording on said HDDVTR.

17. An apparatus as claimed in claim 4, wherein said processing means further comprises tape recording and playback means including a conventional definition digital video tape recorder (CDDVTR) for converting said first field/frame rate in said intermediate fields/frames to said second field/frame rate by recording said intermediate fields/frames at said first field/frame rate and playing back said recorded intermediate fields/frames at said second field/frame rate.

18. An apparatus as claimed in claim 4, further comprising frame recording means including a high definition digital frame recorder (HDDFR) for converting said first field/frame rate in said first format to said second field/frame rate in said first format, and wherein said processing means further comprises a conventional definition digital video tape recorder (CDDVTR) operative to record said intermediate fields/frames at said second field/frame rate and play back the recorded intermediate fields/frames at said second field/frame rate.

19. An apparatus as claimed in claim 4, wherein said processing means further comprises frame recording means having a conventional definition digital frame recorder (CDDFR) for converting said first field/frame rate in said intermediate fields/frames to said second field/frame rate in said intermediate fields/frames, a conventional definition digital video tape recorder (CDDVTR) coupled to said CDDFR for recording said intermediate fields/frames at said second field/frame rate played back by said CDDFR, and said CDDVTR plays back said intermediate fields/frames at said second field/frame rate.

20. An apparatus as claimed in claim 19, wherein said frame recording means further comprises a second CDDFR coupled with said first-mentioned CDDFR such that said intermediate fields/frames are alternately supplied to each said CDDFR for conversion to said second field/frame rate, and each said CDDFR alternately supplies said converted intermediate fields/frames for recording on said CDDVTR.

* * * * *